US011475550B2

(12) United States Patent
Unno et al.

(10) Patent No.: US 11,475,550 B2
(45) Date of Patent: Oct. 18, 2022

(54) INFORMATION PROCESSING APPARATUS, INFORMATION PROCESSING METHOD, PROGRAM, AND INFORMATION PROCESSING SYSTEM

(71) Applicant: Sony Group Corporation, Tokyo (JP)

(72) Inventors: Keisuke Unno, Kanagawa (JP); Masatoshi Takashima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 118 days.

(21) Appl. No.: 16/630,085

(22) PCT Filed: Jun. 4, 2018

(86) PCT No.: PCT/JP2018/021404
§ 371 (c)(1),
(2) Date: Jan. 10, 2020

(87) PCT Pub. No.: WO2019/017095
PCT Pub. Date: Jan. 24, 2019

(65) Prior Publication Data
US 2020/0219246 A1  Jul. 9, 2020

(30) Foreign Application Priority Data

Jul. 18, 2017  (JP) .............................. JP2017-139088

(51) Int. Cl.
*G06T 7/00*  (2017.01)

(52) U.S. Cl.
CPC ............. *G06T 7/0002* (2013.01); *G06T 7/97* (2017.01); *G06T 2207/10016* (2013.01); *G06T 2207/10032* (2013.01); *G06T 2207/30188* (2013.01)

(58) Field of Classification Search
CPC ................... G01J 1/0488; G01J 1/4204; G01J 2001/4266; G01J 2001/428; G01J 3/0297;
(Continued)

(56) References Cited

U.S. PATENT DOCUMENTS

| 4,355,896 A | 10/1982 | Laue |
| 6,160,902 A | 12/2000 | Dickson et al. |

(Continued)

FOREIGN PATENT DOCUMENTS

| JP | 2006-201184 A | 8/2006 |
| JP | 5162890 B2 | 3/2013 |

(Continued)

OTHER PUBLICATIONS

International Search Report and Written Opinion for related International Application No. PCT/JP2018/024040.
(Continued)

*Primary Examiner* — Bobbak Safaipour
(74) *Attorney, Agent, or Firm* — Michael Best & Friedrich LLP

(57) ABSTRACT

Vegetation change information properly indicating a time series change of a vegetation state can be generated. To this end, a data group including vegetation data of multiple time points respectively associated with ratio information which is a component ratio of ambient light is an object to be processed. This device includes an extraction section that extracts, from the data group, vegetation data for use by using ratio information, and a generation section that generates vegetation change information indicating a time series change of a vegetation state by using the vegetation data extracted by the extraction section. By use of ratio information, vegetation data obtained under similar ambient light conditions can be collected.

14 Claims, 19 Drawing Sheets

(58) Field of Classification Search
CPC .............. G01N 21/27; G06K 9/00657; G06T 2207/10016; G06T 2207/10032; G06T 2207/30188; G06T 7/0002; G06T 7/97; F16C 2300/62
See application file for complete search history.

(56) References Cited

U.S. PATENT DOCUMENTS

| | | | | |
|---|---|---|---|---|
| 6,239,425 | B1* | 5/2001 | Hunt | H04N 1/488 |
| | | | | 250/226 |
| 10,873,699 | B2* | 12/2020 | Chazallet | H04N 5/247 |
| 2013/0027439 | A1 | 1/2013 | Kim et al. | |
| 2013/0217439 | A1 | 8/2013 | Ulman | |
| 2015/0223402 | A1* | 8/2015 | Krijn | A01G 7/045 |
| | | | | 47/58.1 LS |
| 2017/0125623 | A1* | 5/2017 | Morgan | H01L 31/0547 |
| 2019/0265162 | A1* | 8/2019 | Fujiyama | A01G 7/00 |
| 2019/0268994 | A1* | 8/2019 | Paolini | H05B 45/20 |
| 2020/0116558 | A1* | 4/2020 | Pacala | G01S 7/4815 |

FOREIGN PATENT DOCUMENTS

| | | |
|---|---|---|
| JP | 2015-038454 A | 2/2015 |
| JP | 2015-204788 A | 11/2015 |
| JP | 2016-185156 A | 10/2016 |
| JP | 2017-035055 A | 2/2017 |
| WO | 2016/017640 A2 | 2/2013 |
| WO | WO-2013017648 A2 | 2/2013 |

OTHER PUBLICATIONS

Thomas V et al: "Spatial modelling of photosynthesis for a boreal mixedwood forest by integrating micrometeorological, lidar and hyperspectral remote sensing data", Agricultural and Forest Meteorology, Elsevier, Amsterdam, NL, vol. 149, No. 3-4, Mar. 11, 2009 (Mar. 11, 2009), pp. 639-654, XP025912684, ISSN: 0168-1923, DOI: 10.1016/J.AGRFORMET.2008.10.016 [retrieved on Feb. 5, 2009] Section 4.3; figures 3, 5-6.
M. Disney et al: Comparison of MODIS broadband albedo over an agricultural site with ground measurements and values derived from Earth observation data at a range of spatial scales, International Journal of Remote Sensing, vol. 25, No. 23, Dec. 1, 2004 (Dec. 1, 2004), 5297-5317, XP055693340, GB ISSN: 0143-1161, DOI: 10.1080/01431160410001720180 Sections 1, 2.4; figures 1.7-8, 10.
Sankaran Sindhuja et al: "Low-altitude, high-resolution aerial imaging systems for row and field crop phenotyping: A review", European Journal of Agronomy, Elsevier, Amsterdam, NL, vol. 70, Aug. 15, 2015 (Aug. 15, 2015), pp. 112-123, XP029265296, ISSN: 1161-0301, DOI: 10.1016/J.EJA.2015.07.004 figures 1, 3-4.
Kobayashi Hideki et al: "On the correct estimation of gap fraction: How to remove scattered radiation in gap fraction measurements?", Agricultural and Forest Meteorology, Elsevier, Amsterdam, NL, vol. 174, Apr. 2, 2013 (Apr. 2, 2013), 170-183, XP028546079, ISSN: 0168-1923, DOI: 10 .1016/J. AGRFORMET. 2013. 02. 013 Section 1.
Extended European Search Report dated May 18, 2020 for corresponding European Application No. 18836091.1.

* cited by examiner

A

| DATE | RATIO | NDVI |
|---|---|---|
| 5TH NOV. | 4.70 | 0.784 |
| 6TH NOV. | 3.81 | 0.803 |
| 7TH NOV. | 3.43 | 0.808 |
| 8TH NOV. | 0.00 | 0.814 |
| 9TH NOV. | 4.68 | 0.792 |
| 10TH NOV. | 0.00 | 0.792 |
| 11TH NOV. | 0.00 | 0.811 |
| 12TH NOV. | 0.00 | 0.837 |
| 13TH NOV. | 3.90 | 0.807 |

B

A

| DATE | RATIO | NDVI |
|---|---|---|
| 5TH NOV. | 4.70 | - |
| 6TH NOV. | 3.81 | 0.803 |
| 7TH NOV. | 3.43 | 0.808 |
| 8TH NOV. | 0.00 | - |
| 9TH NOV. | 4.68 | - |
| 10TH NOV. | 0.00 | - |
| 11TH NOV. | 0.00 | - |
| 12TH NOV. | 0.00 | - |
| 13TH NOV. | 3.90 | 0.807 |

B

A

| DATE | RATIO | NDVI |
|---|---|---|
| 5TH NOV. | 4.70 | 0.784 |
| 6TH NOV. | 3.81 | 0.803 |
| 7TH NOV. | 3.43 | 0.808 |
| 8TH NOV. | 0.00 | 0.814 |
| 9TH NOV. | 4.68 | 0.792 |
| 10TH NOV. | 0.00 | 0.792 |
| 11TH NOV. | 0.00 | 0.848 |
| 12TH NOV. | 0.00 | 0.811 |
| 13TH NOV. | 3.90 | 0.807 |
| 14TH NOV. | 0.00 | 0.837 |
| 15TH NOV. | 0.00 | 0.865 |
| 16TH NOV. | 0.00 | 0.839 |
| 17TH NOV. | 4.00 | 0.829 |
| 18TH NOV. | 4.42 | 0.827 |
| 19TH NOV. | 0.00 | 0.830 |
| 20TH NOV. | 0.00 | 0.838 |
| 21ST NOV. | 0.00 | 0.871 |
| 23RD NOV. | 0.00 | 0.873 |
| 24TH NOV. | 0.00 | 0.867 |
| 25TH NOV. | 5.08 | 0.813 |
| 26TH NOV. | 4.26 | 0.822 |
| 27TH NOV. | 0.00 | 0.857 |

B

A

| DATE | RATIO | NDVI |
|---|---|---|
| 5TH NOV. | 4.70 | — |
| 6TH NOV. | 3.81 | 0.803 |
| 7TH NOV. | 3.43 | 0.808 |
| 8TH NOV. | 0.00 | — |
| 9TH NOV. | 4.68 | 0.792 |
| 10TH NOV. | 0.00 | — |
| 11TH NOV. | 0.00 | — |
| 12TH NOV. | 0.00 | — |
| 13TH NOV. | 3.90 | 0.807 |
| 14TH NOV. | 0.00 | — |
| 15TH NOV. | 0.00 | — |
| 16TH NOV. | 0.00 | — |
| 17TH NOV. | 4.00 | 0.829 |
| 18TH NOV. | 4.42 | 0.827 |
| 19TH NOV. | 0.00 | — |
| 20TH NOV. | 0.00 | — |
| 21ST NOV. | 0.00 | — |
| 23RD NOV. | 0.00 | — |
| 24TH NOV. | 0.00 | — |
| 25TH NOV. | 5.08 | — |
| 26TH NOV. | 4.26 | 0.822 |
| 27TH NOV. | 0.00 | — |

B

A

| DATE | RATIO | NDVI (CONVERTED VALUE) |
|---|---|---|
| 5TH NOV. | 4.00 | 0.796 |
| 6TH NOV. | 4.00 | 0.800 |
| 7TH NOV. | 4.00 | 0.798 |
| 8TH NOV. | 0.00 | – |
| 9TH NOV. | 4.00 | 0.803 |
| 10TH NOV. | 0.00 | – |
| 11TH NOV. | 0.00 | – |
| 12TH NOV. | 4.00 | 0.805 |
| 13TH NOV. | 0.00 | – |

B

A

| DATE | RATIO | NDVI (CONVERTED VALUE) |
|---|---|---|
| 5TH NOV. | 4.00 | 0.796 |
| 6TH NOV. | 4.00 | 0.800 |
| 7TH NOV. | 4.00 | 0.798 |
| 8TH NOV. | 0.00 | |
| 9TH NOV. | 4.00 | 0.803 |
| 10TH NOV. | 0.00 | |
| 11TH NOV. | 0.00 | |
| 12TH NOV. | 0.00 | |
| 13TH NOV. | 4.00 | 0.805 |
| 14TH NOV. | 0.00 | |
| 15TH NOV. | 0.00 | |
| 16TH NOV. | 0.00 | |
| 17TH NOV. | 4.00 | 0.829 |
| 18TH NOV. | 4.00 | 0.834 |
| 19TH NOV. | 0.00 | |
| 20TH NOV. | 0.00 | |
| 21ST NOV. | 0.00 | |
| 23RD NOV. | 0.00 | |
| 24TH NOV. | 0.00 | |
| 25TH NOV. | 4.00 | 0.831 |
| 26TH NOV. | 4.00 | 0.826 |
| 27TH NOV. | 0.00 | |

B

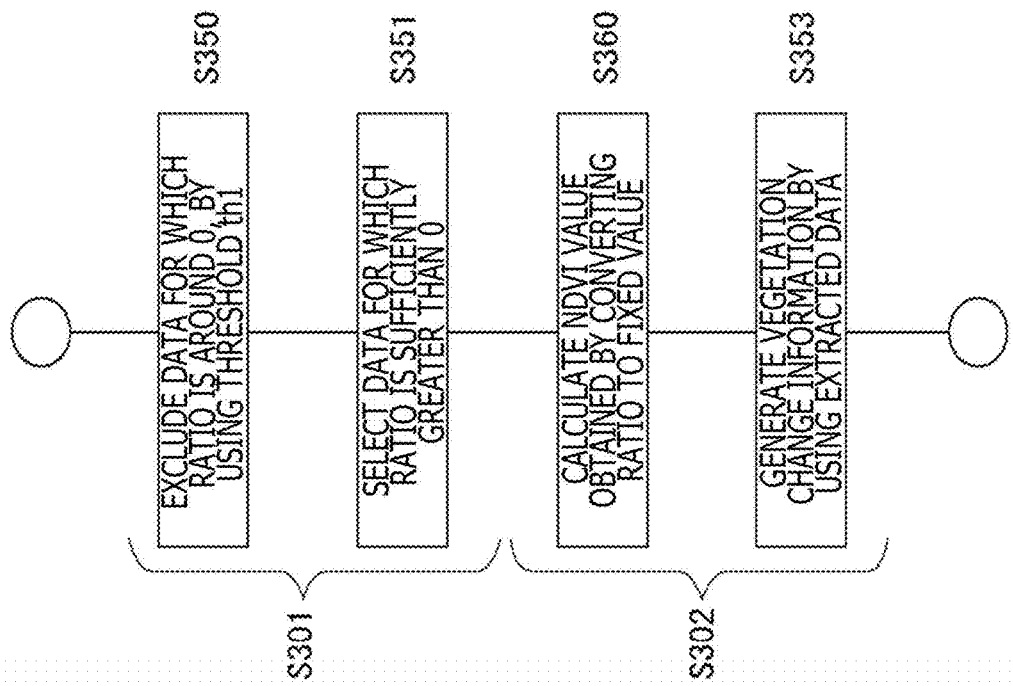
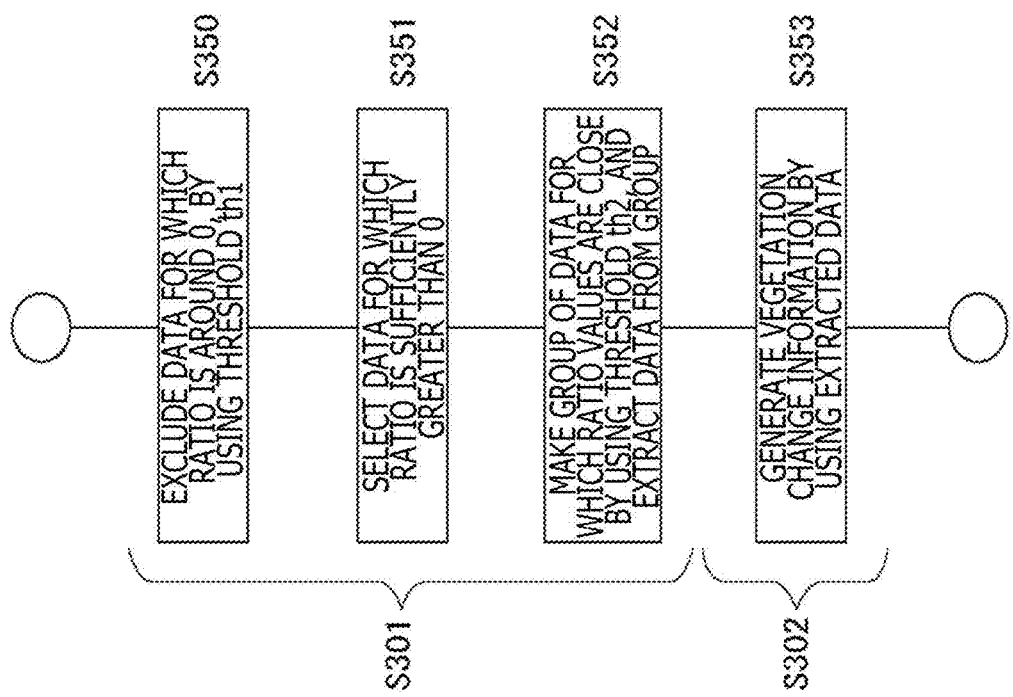

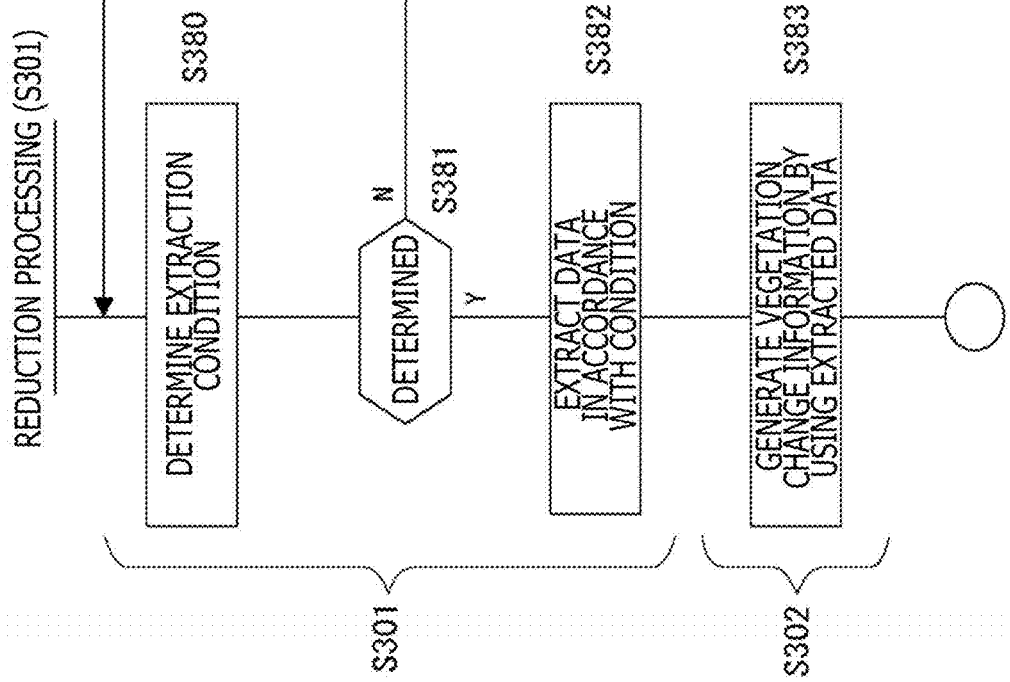
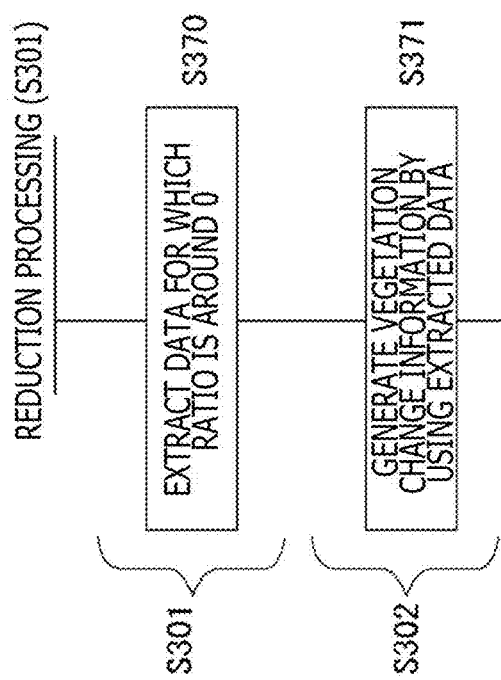

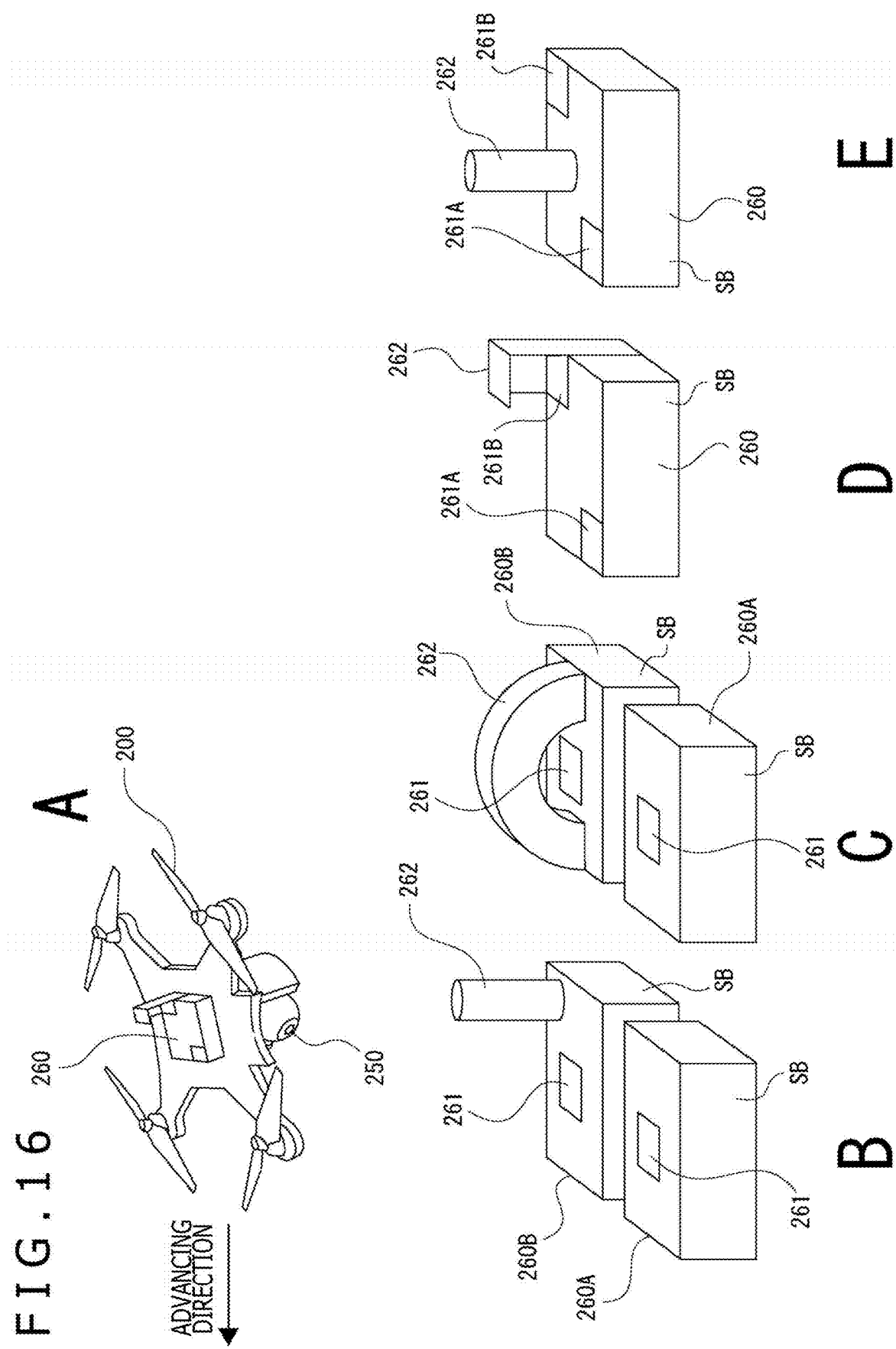

FIG.17
A
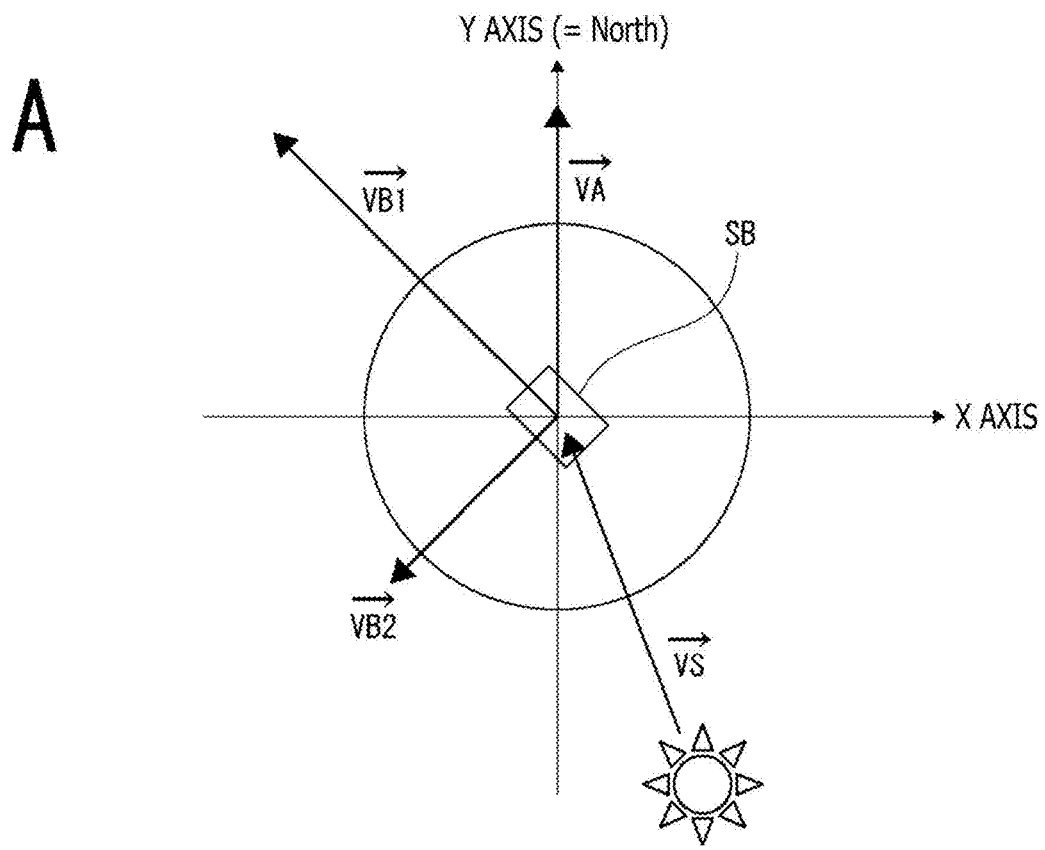
B
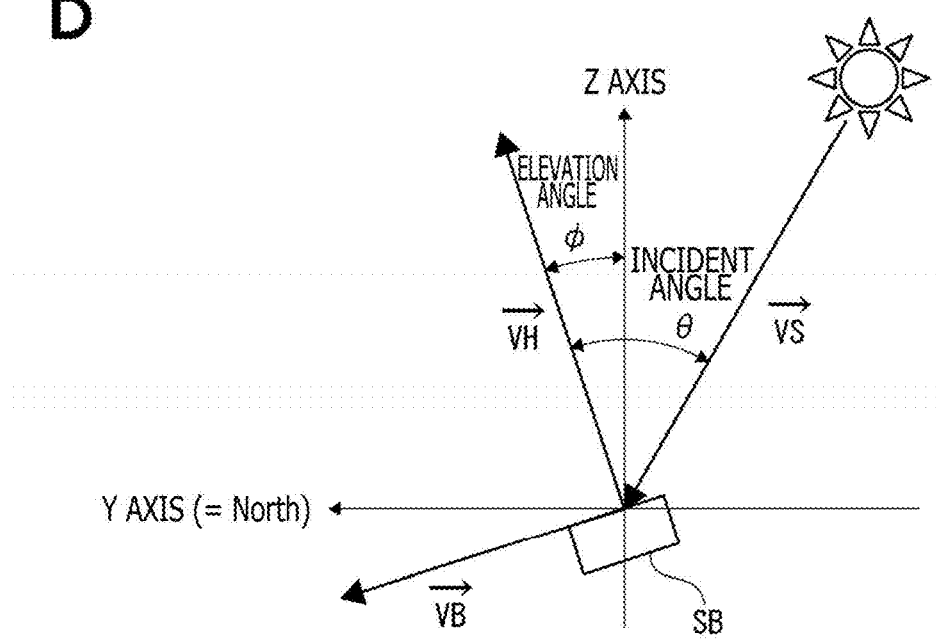

FIG.19
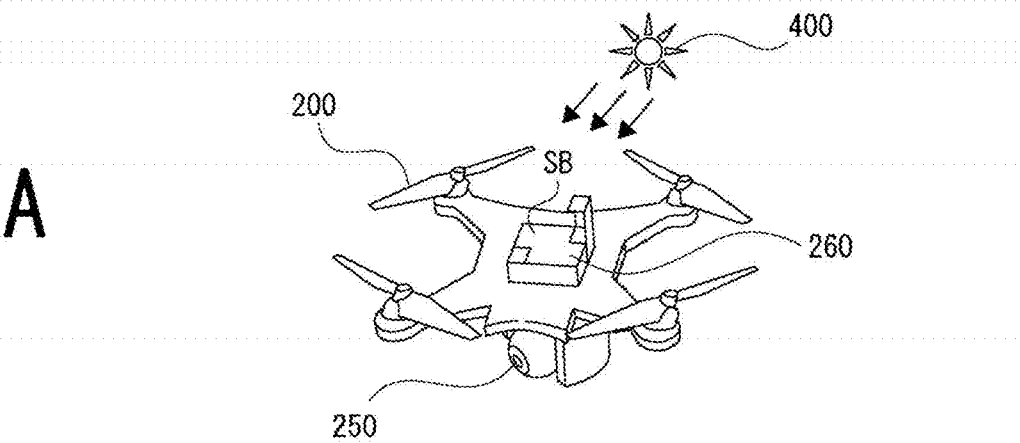
A
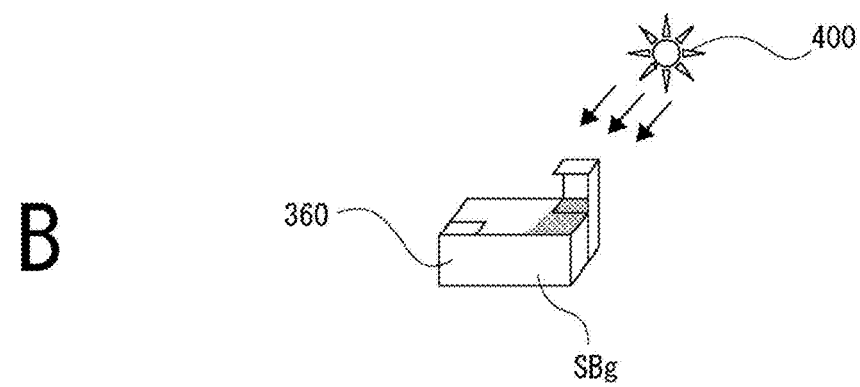
B
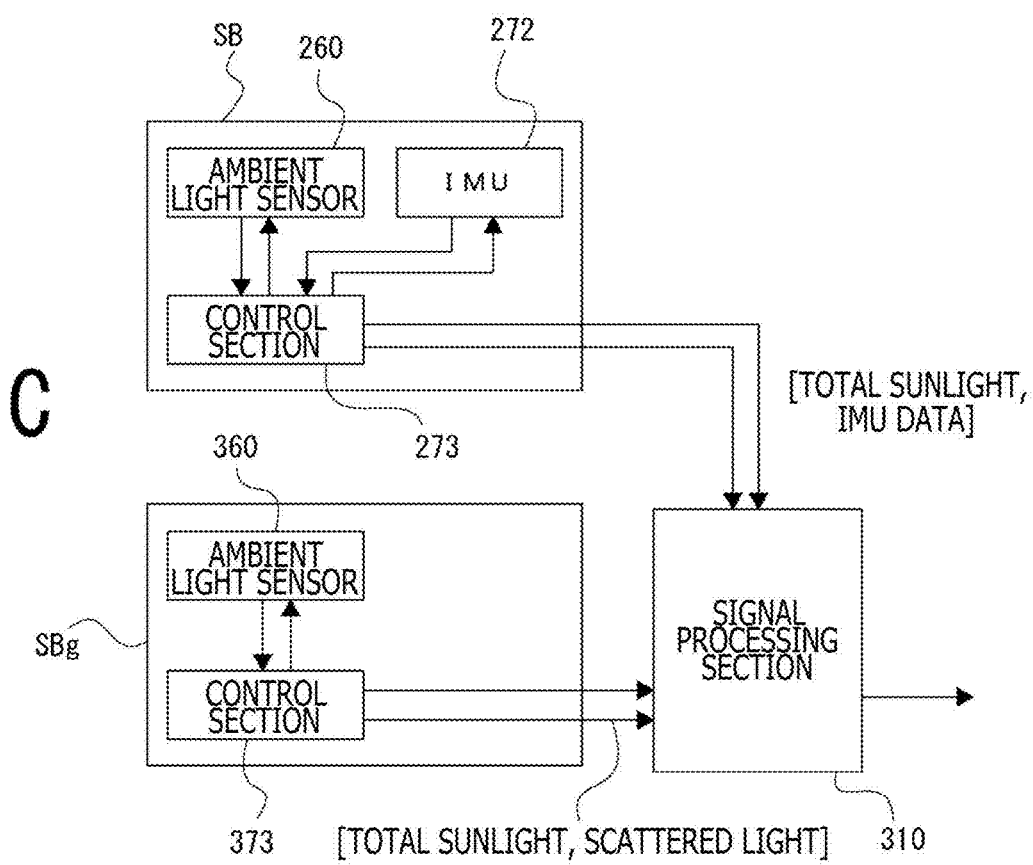
C

INFORMATION PROCESSING APPARATUS, INFORMATION PROCESSING METHOD, PROGRAM, AND INFORMATION PROCESSING SYSTEM

TECHNICAL FIELD

The present technique relates to an information processing apparatus, an information processing method, a program, and an information processing system, and particularly, to a technique suitable for generation of vegetation change information which presents a change of a vegetation state.

BACKGROUND ART

For example, an attempt to perform remote sensing on the vegetation state of plants by capturing an image of the vegetation state while moving, above a farm field, a small flying body having an image capture device mounted thereon, has been made.

PTL 1 discloses a technique of capturing an image of a farm field and performing remote sensing.

CITATION LIST

Patent Literature

[PTL 1]
Japanese Patent No. 5162890

SUMMARY

Technical Problem

A vegetation index can be measured from a captured image of vegetation in a farm field. For example, when vegetation indexes are obtained from daily captured images, vegetation change information indicating a time series change of the vegetation state can be generated. For example, as vegetation indexes, NDVIs (Normalized Difference Vegetation Indexes) are obtained and arranged in time series so that a change of the vegetation state can be confirmed.

However, regarding vegetation indexes such as NDVIs, value fluctuations are caused by a difference in condition such as weather (clear/cloudy). Accordingly, even when confirming a daily change of NDVI is desired, for example, vegetation change information in which NDVIs are arranged in time series, includes value fluctuations caused by the weather. Therefore, even if taking a look at the vegetation change information, a worker, etc., cannot correctly discern a daily change of the vegetation.

Therefore, an object of the present technique is to make it possible to generate vegetation change information that is less likely to come under the influence of a condition such as weather, and to make it possible to properly present a time series change of a vegetation state.

Solution to Problem

An information processing apparatus according to the present technique includes
an extraction section that extracts, from vegetation data of multiple time points respectively associated with ratio information which is a component ratio of ambient light, at least a part of the vegetation data on the basis of the ratio information.

That is, a data group including vegetation data of the time points associated with the component ratio (ratio information) of ambient light at the corresponding observation times, is an object to be processed. In this case, vegetation data that is suitable to be outputted is extracted on the basis of the ratio information.

Further, the information processing apparatus includes a generation section that generates, by using the vegetation data extracted by the extraction section, vegetation change information indicating a time series change of the vegetation data.

That is, vegetation change information is generated by use of the vegetation data that is suitable to be outputted and that has been extracted by the extraction section on the basis of the ratio information.

In the information processing apparatus, the ratio information may be a value of a ratio of a detection value of direct light and a detection value of scattered light, or is a value of a ratio of a detection value of total sunlight and a detection value of scattered light.

For example, direct light is a light component (so-called direct sunlight) having directly come from a light source such as the sun, and scattered light is light scattered by molecules and cloud particles in the atmosphere. The sum of direct light and scattered light is total sunlight.

In the information processing apparatus, the extraction section may execute processing of excluding, from vegetation data for use, vegetation data for which associated ratio information has a value determined to be around a specific value by comparison with a threshold.

For example, in a case where the ratio information is (direct light)/(scattered light), the ratio information is around 0 in cloudy weather.

For example, in a case where the ratio information is (total sunlight)/(scattered light), the ratio information is around 1 in cloudy weather. The value "0" or "1" is set as the specific value, and vegetation data for which ratio information has a value equal to or around the specific value, is excluded.

In the information processing apparatus, the extraction section may execute processing of extracting vegetation data for which associated ratio information has a value different from a specific value by at least a prescribed amount.

For example, in a case where the ratio information is calculated such that the ratio information becomes "0" or "1" in cloudy weather, the value "0" or "1" is set as the specific value, and vegetation data for which the ratio information is sufficiently apart from the specific value is extracted as vegetation data for use (or a candidate thereof).

In the information processing apparatus, the extraction section may execute processing of extracting multiple sets of vegetation data for which associated ratio information have respective values determined to be close to one another by comparison with a threshold.

The situation in which the ratio information which is a component ratio of ambient light is close to one another, means that the states of ambient light at observation times for calculating vegetation data are similar to one another.

In the information processing apparatus, the extraction section may execute processing of extracting vegetation data for which associated ratio information has a value determined to be around a specific value by comparison with a threshold.

For example, in the case where ratio information is calculated such that the ratio information becomes "0" or "1" in cloudy weather, the value "0" or "1" is set as the specific value, and vegetation data for which ratio information is around the specific value is extracted as vegetation data for use (or a candidate thereof).

In the information processing apparatus, an extraction condition for the extraction processing by the extraction section may be variably set.

For example, for the extraction processing such as excluding vegetation data for which ratio information is close to the specific value, extracting vegetation data for which ratio information is sufficiently apart from the specific value, extracting multiple sets of vegetation data for which ratio information are close to one another, and extracting vegetation data for which ratio information is close to the specific value, the condition can be variably set.

In the information processing apparatus, the generation section may convert the vegetation data extracted by the extraction section, to a value with the ratio information adjusted to be fixed, and may generate vegetation change information by using the converted vegetation data.

For example, vegetation change information is generated by use of vegetation data for which extracted ratio information are close to one another. The vegetation data is converted so as to achieve a state where the value of the ratio information is fixed.

The information processing apparatus may include a vegetation data calculation section that calculates vegetation data by using vegetation observation data of each time point.

That is, vegetation data of each time point is generated in the information processing apparatus.

In the information processing apparatus, the vegetation data calculation section may obtain an NDVI value as the vegetation data.

That is, an NDVI value which is a vegetation index is obtained, and the vegetation change information as the change of the NDVI is generated.

The information processing apparatus may include a ratio calculation section that calculates ratio information which is a component ratio of ambient light, so as to correspond to the vegetation data of each time point by using a detection value of ambient light at the time point.

That is, ratio information corresponding to vegetation data of each time point is generated in the information processing apparatus. The ratio information is calculated by use of a light detection value obtained at substantially the same time point as that of a detection value used for generation of vegetation data.

In the information processing apparatus, the ratio calculation section may calculate the ratio information by using detection values obtained by an ambient light sensor including a light reception section on which a light shielding body casts a shadow and the light reception section which does not come under an influence of the light shielding body, the detection values being obtained at the respective light reception sections.

By use of the ambient light sensor mounted on a flying body, direct light and scattered light can be detected with the light shielding body.

An information processing method according to the present technique includes executing, by means of an information processing apparatus, processing of extracting, from a data group including vegetation data of multiple time points respectively associated with ratio information which is a component ratio of ambient light, vegetation data for use by using the ratio information. Accordingly, vegetation data for generating vegetation change information that is less likely to come under the influence of the environmental condition can be extracted in the information processing apparatus.

A program according to the present technique is for causing a computer device to execute processing of extracting, from a data group including vegetation data of multiple time points respectively associated with ratio information which is a component ratio of ambient light, vegetation data for use by using the ratio information. Accordingly, a computer device that extracts vegetation data for generating vegetation change information that is less likely to come under the influence of the environmental condition can be easily implemented.

An information processing system according to the present technique includes an ambient light sensor including a light reception section on which a light shielding body casts a shadow and a light reception section which does not come under an influence of the light shielding body, the ratio calculation section, the extraction section, and the generation section. Accordingly, a system suitable for generation of vegetation change information that is less likely to come under the influence of the environmental condition, can be constructed.

Advantageous Effect of Invention

The present technique provides an effect that vegetation change information in which a fluctuation due to a condition such as weather is less likely to appear and a time series change of a vegetation state can be properly presented, can be generated.

Note that the effect described herein is not limited, and any of the effects disclosed in the present description may be provided.

BRIEF DESCRIPTION OF DRAWINGS

FIG. 14 is a flowchart of an example of the extraction processing and generation processing according to the embodiment.

FIG. 15 is a flowchart of an example of the extraction processing and generation processing according to the embodiment.

FIG. 16 is an explanatory diagram of a structure example of the ambient light sensors according to the embodiment.

FIG. 17 is an explanatory diagram of an incident angle to an ambient light sensor according to the embodiment.

FIG. 19 is an explanatory diagram of a scheme for acquiring total sunlight and scattered light according to the embodiment.

DESCRIPTION OF EMBODIMENTS

Hereinafter, an embodiment will be explained in accordance with the following order.
<1. Configuration of System and Devices>
<2. Extraction Processing Using Ratio information>
<3. Conversion Processing of Vegetation Index Using Ratio Information>
<4. Processing Examples>
<5. Various Examples Regarding Light Detection Using Ambient Light Sensors>
<6. Conclusion and Modification>

1. CONFIGURATION OF SYSTEM AND DEVICES

An embodiment will be explained with use of, as an example, a case where sensing of the vegetation state of a farm field is performed.

Figure 1:
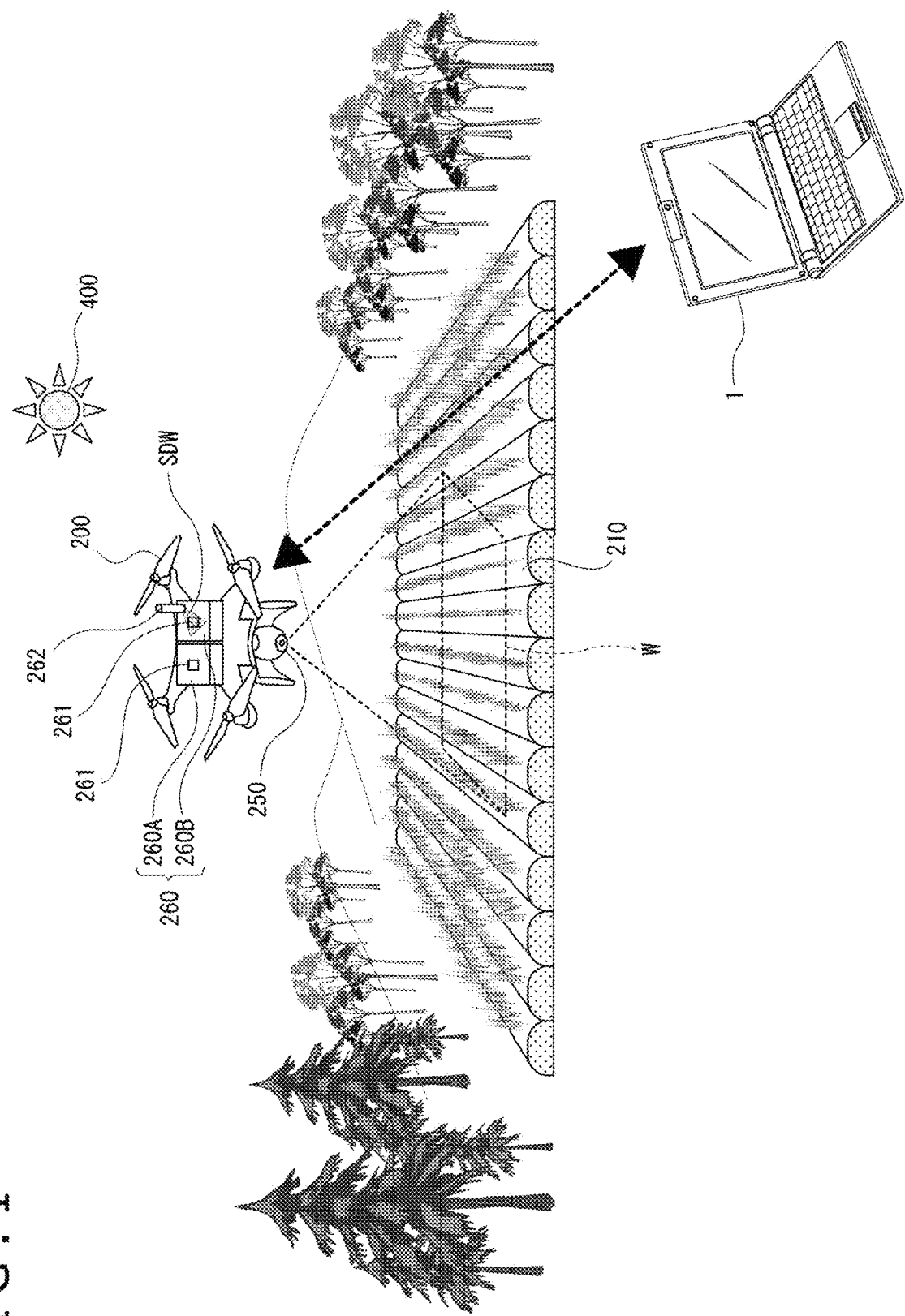
FIG. 1 is an explanatory diagram of a state in which an image of a farm field is captured according to an embodiment of the present technique.

As depicted in FIG. 1, remote sensing regarding vegetation in a farm field 210 is performed, for example, every day by use of an image capture device 250 mounted on a flying body 200. By use of vegetation data (e.g. vegetation index data) obtained by the daily observation, vegetation change information indicating a time series change of the vegetation state is generated by an information processing apparatus 1. An explanation will be given of this case as an example.

FIG. 1 depicts a state of the farm field 210.

The flying body 200 which is compact can move above the farm field 210 by operator's wireless control or wireless automatic control, for example.

In the flying body 300, the image capture device 250 is set so as to capture images of an area under the device, for example. When the flying body 200 is moving along a prescribed route above the farm field 210, the image capture device 250 regularly captures stationary images or captures a video image, for example so that an image of a range W of the image capture visual field at each time point can be obtained.

Various types of image capture devices may be used as the image capture device 250.

For example, an image file (image captured at a certain time point) obtained by image capturing performed by the image capture device 250 may include a spectroscopic measurement image. That is, a multi-spectrum camera may be used as the image capture device 250, and images to be captured thereby may include a measurement image including information two or more specific wavelength regions.

Also, a camera that captures an image of R (red), G (green), and B (blue) visible light may be used as the image capture device 250.

Also, a camera for obtaining captured images of a red wavelength region (RED) and a near infrared region (NIR: Near Infra RED) such that NDVI can be calculated from the obtained images, may be used as the image capture device 250. NDVI refers to an index indicating the distribution condition or activity level of vegetation.

Hereinafter, an explanation will be given on the assumption that a camera capable of obtaining captured images of a red wavelength region (RED) and a near infrared region (NIR) is used as the image capture device 250.

In addition, tag information is added to an image obtained by image capturing performed by the image capture device 250. The tag information includes image capture date-and-time information, positional information (latitude/longitude information) as GPS (Global Positioning System) data, image capturing device information (identification information or model information about the camera, etc.), information about image data (information about an image size, a wavelength, image capturing parameters, and the like), and the like.

In the present embodiment, not only the image capture device 250 but also ambient light sensors 260 are mounted on the flying body 200. In the example in FIG. 1, two ambient light sensors 260A and 260B are mounted on the upper surface side of the flying body 200.

Note that, to collectively refer to one or more ambient light sensors for use, an expression "ambient light sensors 260" is used.

The ambient light sensors 260A and 260B each have a light reception section 261 provided on the upper surface side thereof, so as to detect light. With this configuration, the level (the illumination, the photosynthetic photon flux density (hereinafter, referred to as "PPFD"), etc.) of ambient light the light source of which is sun 400, can be detected.

Note that the PPFD refers to a photosynthetic photon flux density only in a wavelength region of 400 to 700 nm where chlorophyll can be absorbed.

The light amount of total sunlight and the light amount of scattered light can be detected from detection values obtained by the ambient light sensors 260A and 260B. Further, from these light amounts, the light amount of direct light can be calculated.

Outdoor ambient light is generally expressed by (total sunlight)=(direct light)+(scattered light).

Direct light refers to so-called direct sunlight from the sun 400.

Scattered light refers to light scattered by molecules and cloud particles in the atmosphere other than the direct sunlight.

Total sunlight is total light from the whole sky, and also is the sum of direct light and scattered light.

Nothing for shielding sunlight is provided to the ambient light sensor 260A. Thus, the ambient light sensor 260A receives both direct light and scattered light. Therefore, the illuminance, etc. of total sunlight can be detected by the ambient light sensor 260A.

A pole-shaped light shielding body 262 is protrudingly provided on the upper surface of the ambient light sensor 260B. The light shielding body 262 casts a shadow SDW on the light reception section 261. As a result, the light reception section 261 receives no direct light. Therefore, the illumination, etc. of scattered light is detected by the ambient light sensor 260B.

Regarding direct light, the illumination thereof can be obtained by subtracting the detection value obtained by the ambient light sensor 260B from the detection value obtained by the ambient light sensor 260A.

Sensors that each detect the illuminations of R (red), G (green), B (blue), NIR (near infrared light) as ambient light may be used as the ambient light sensors 260A and 260B.

That is, detection values of R, G, B, IR (E-RED, E-GREEN, E-BLUE, E-NIR) of total sunlight can be obtained by the ambient light sensor 260A, and detection values of R, G, B, IR (E-RED, E-GREEN, E-BLUE, E-NIR) of scattered light can be obtained by the ambient light sensor 260B.

Note that tag information is added to the detection values obtained by the ambient light sensors 260A and 260B. For example, detection date-and-time information and positional information (latitude/longitude information) as GPS data are included as the tag information.

The reason why the pole-shaped light shielding body 262 is provided on the ambient light sensor 260B, is that the light reception section 261 is desirably shielded from only direct sunlight, if possible. In other words, the light reception section 261 is preferably shielded at a pin point only from the sun 400. The reason for this is that wide light shielding results in shielding of even a part of scattered light so that the accuracy of detection at a scattered light level may be deteriorated or the values may be varied.

Image data and detection values obtained by the image capture device 250 and the ambient light sensors 260 mounted on the flying body 200 are transmitted to the information processing apparatus 1. The information processing apparatus 1 generates vegetation change information indicating a time series change of the vegetation state, by using the image data and the detection values. Specifically, in the present embodiment, an example in which vegetation change information indicating a time series change of NDVI is generated will be explained. The present embodiment is configured to be able to provide vegetation change information in a state where a fluctuation of an NDVI value due to the influence of the weather, particularly, is suppressed.

The information processing apparatus 1 is implemented as a PC (personal computer) or an FPGA (field-programmable gate array), for example.

Note that the information processing apparatus 1 is a separated from the image capture device 250 in FIG. 1. However, a computation device (e.g. microcomputer) serving as the information processing apparatus 1 may be provided in a unit including the image capture device 250.

Figure 2:
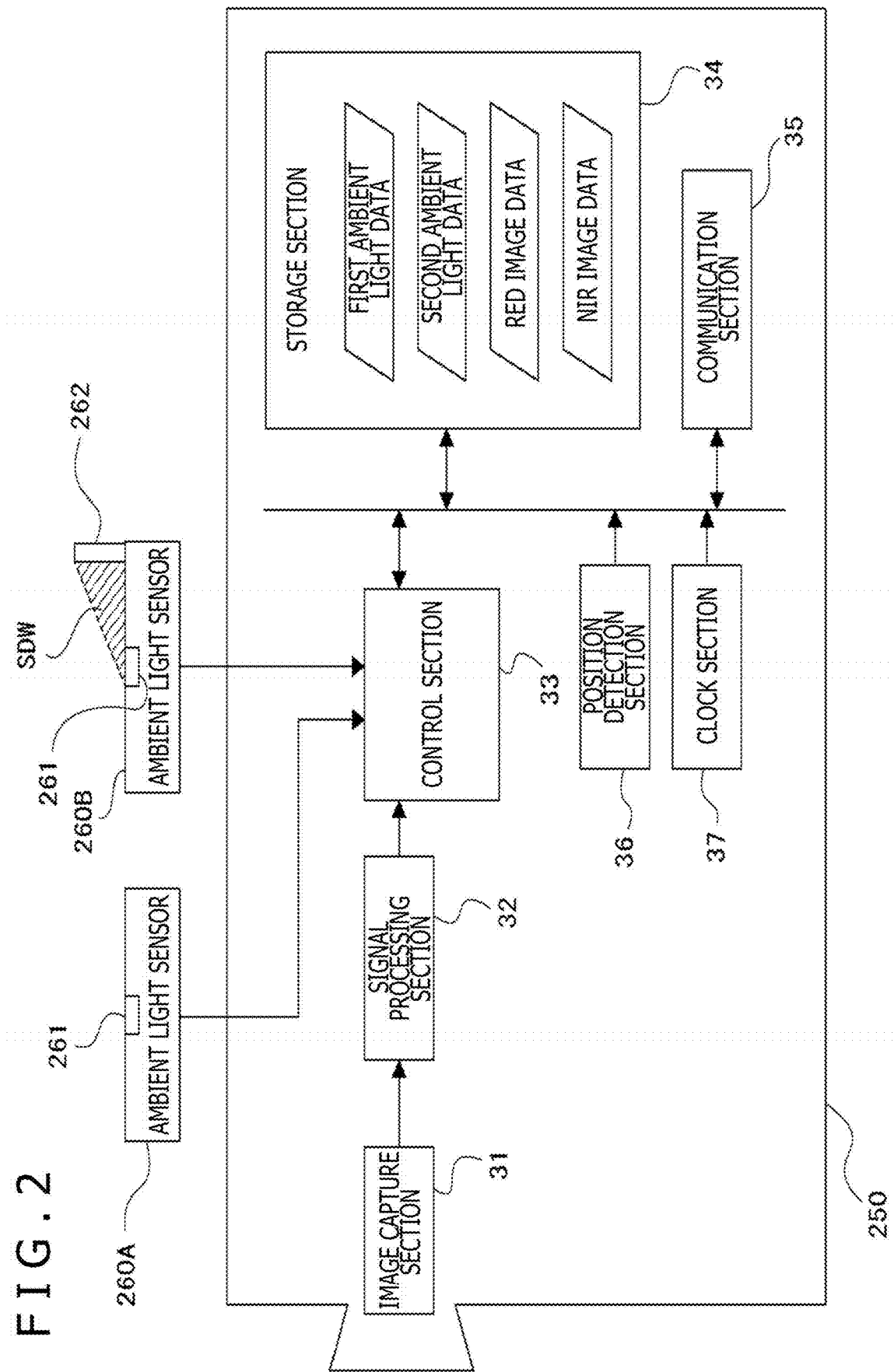
FIG. 2 is a block diagram of an image capture device and ambient light sensors according to the embodiment.

FIG. 2 depicts a configuration example of the image capture device 250.

The image capture device 250 includes an image capture section 31, a signal processing section 32, a control section 33, a storage section 34, a communication section 35, a position detection section 36, and a clock section 37.

The image capture section 31 includes an image capture lens system, an exposure part, a filter, and an image sensor, etc., and outputs a captured image signal as an electric signal upon receiving subject light.

That is, in the image capture section 31, light (reflection light) from a subject such as an object to be measured, is incident on the image sensor via the lens system and the filter.

The lens system refers to an incident optical system including various lenses such as an incident end lens, a zoom lens, a focus lens, and a condensing lens.

The filter refers to a filter for taking out a wavelength to be measured of an object to be measured. This refers to a color filter commonly formed on an image sensor, a wavelength filter commonly disposed forward of an image sensor, or the like.

The exposure part refers to a part, of the image sensor, where exposure control is performed by adjustment of the opening amount of an optical system such as a lens system, an iris (aperture), and the like such that sensing is performed in the state where a signal charge falls within a dynamic range without being saturated.

The image sensor is formed so as to have, on a sensor surface thereof, a sensing element in which a plurality of pixels is two-dimensionally arranged by a repeated pattern.

The image sensor detects light having passed through the filter by means of a sensing element, and outputs a captured image signal corresponding to the light amount of light to the signal processing section 32.

The signal processing section 32 performs AGC processing, A/D conversion processing, and the like on the captured image signal outputted from the image sensor of the image capture section 31 so as to convert the captured image signal to digital data, further performs various necessary signal processing on the digital data, and outputs, to the control section 33, the resultant data as image data on an object to be measured.

When it is assumed that captured images of a red wavelength region (RED) and a near infrared region (NIR) are obtained as the image data on an object to be measured, the signal processing section 32 generates RED image data and NIR image data, and outputs the generated data to the control section 33.

The control section 33 includes a microcomputer, for example, and controls the overall operation of the image capture device 250, such as an image capture operation, an image data storing operation, and a communication operation.

The control section 33 executes processing of sequentially storing, in the storage section 34, RED image data and NIR image data supplied from the signal processing section 32. When doing so, the control section 33 adds tag information to the RED image data and the NIR image data, makes an image file of the resultant data, and stores the file in the storage section 34.

For example, the control section 33 associates the RED image data and the NIR image data of each time point with the positional information obtained by the position detection section 36 and the time-and-date information obtained by the clock section 37, and makes a file of the resultant data. Note that the position detection section 36 includes a GPS receptor, for example, and supplies, as the positional information, information about the latitude and longitude to the control section 33.

In addition, the control section 33 adds the aforementioned image capture device information and information about the image data.

Accordingly, regarding the RED image data and the NIR image data stored in the storage section 34, information about the position and the data and time of image capturing, the data type, and the type of the image capture device, and the like can be recognized at an external device such as the information processing apparatus 1.

In the example in FIG. 2, the detection values obtained by the ambient light sensors 260A and 260B are inputted to the control section 33 of the image capture device 250.

The control section 33 causes the storage section 34 to sequentially store detection values obtained by the ambient light sensors 260A and 260B, as first ambient light data and second ambient light data, respectively.

Further, the control section 33 adds the positional information and the date-and-time information at the detection time to the first ambient light data and the second ambient light data by using the positional information from the position detection section 36 and the date-and-time information from the clock section 37, and causes the storage section 34 to store the resultant data. Therefore, regarding the first ambient light data and the second ambient light data stored in the storage section 34, information about the position and the date and time of image capturing can be recognized at an external device such as the information processing apparatus 1.

Note that, in the case where the ambient light sensors 260A and 260B have the aforementioned configuration, the first ambient light data which is a detection value obtained by the ambient light sensor 260A is total sunlight data. On the other hand, the second ambient light data which is a detection value obtained by the ambient light sensor 260B having the light reception section 261 on which the light shielding body 262 casts the shadow SDW is scattered light data.

For example, a flash memory which is an internal memory of the image capture device 250 or a portable memory card is used as the storage section 34. Another type of a storage medium also may be used.

The communication section 35 performs transmission and reception of data with an external device via wired or wireless communication. For example, wired communication based on the USB (Universal Serial Bus) standard or the like may be performed, or communication based on a wireless communication standard such as the Bluetooth (registered trademark) or the WI-FI (registered mark) may be performed.

In any case, the RED image data, the NIR image data, the first ambient light data, and the second ambient light data stored in the storage section 34 can be transferred by the communication section 35 to an external device such as the information processing apparatus 1.

Note that, in a case where a portable memory card or the like is used as the storage section 34, the data stored therein may be delivered to the information processing apparatus 1 or the like through delivery of a recording medium such as the memory card.

Next, the configuration of the information processing apparatus 1 will be explained with reference to FIG. 3.

Figure 3:
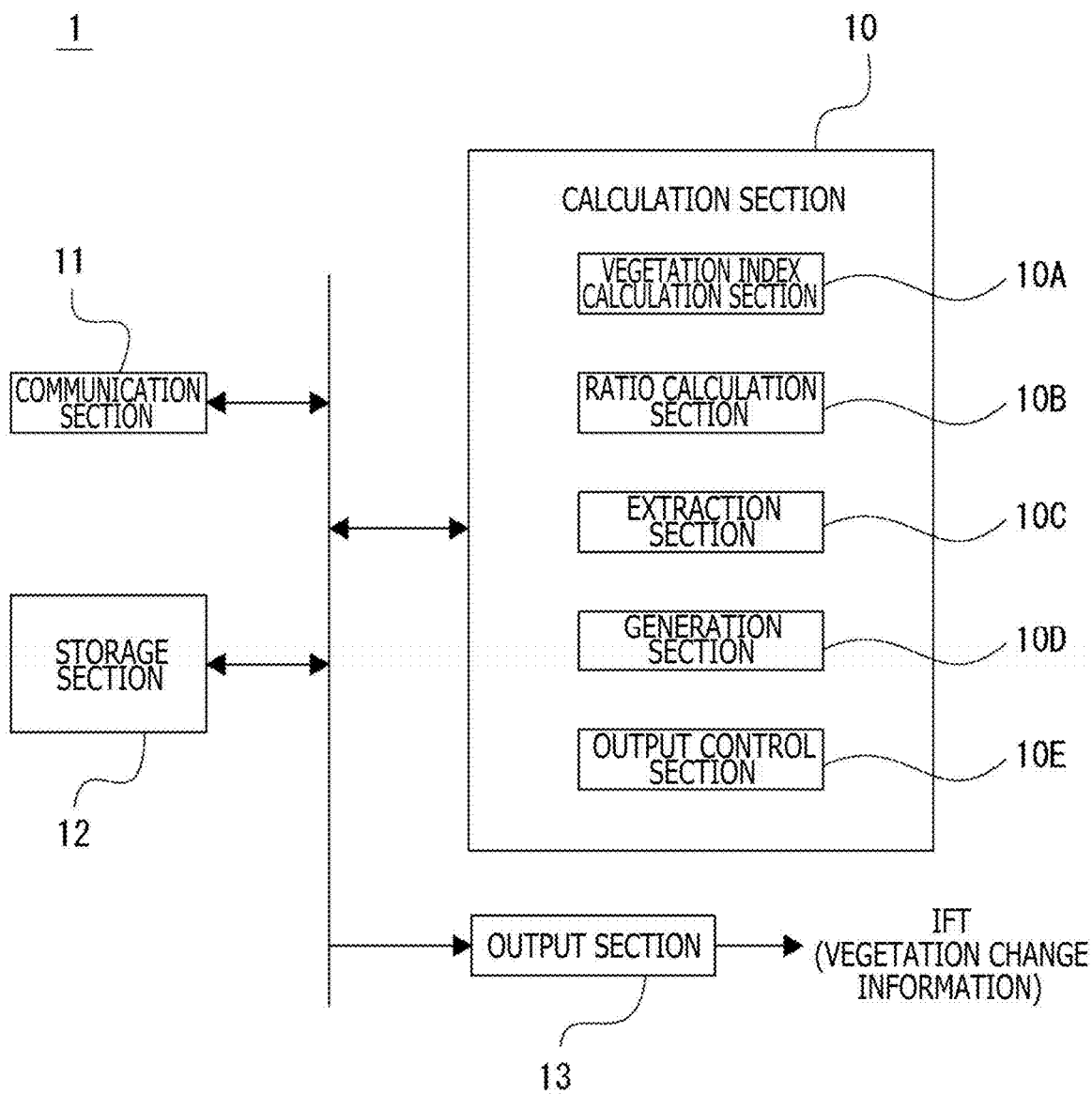
FIG. 3 is a block diagram of an information processing apparatus according to the embodiment.

FIG. 3 depicts the functional configuration of the information processing apparatus 1 as the present embodiment. As depicted in FIG. 3, the information processing apparatus 1 includes a calculation section 10, a communication section 11, a storage section 12, and an output section 13.

The communication section 11 is configured to be able to perform transmission and reception of data with at least the communication section 35 of the image capture device 250 via wired or wireless communication. Over the communication performed by the communication section 11, the information processing apparatus 1 can acquire the RED image data, the NIR image data, the first ambient light data, and the second ambient light data stored in the storage section 34 of the image capture device 250. For example, the information processing apparatus 1 may receive and acquire the data by sequentially performing wireless communication while the image capture device 250 is capturing images, or may collectively receive and acquire the data of each time point after image capturing is completed.

The storage section 12 stores the RED image data, the NIR image data, the first ambient light data, and the second ambient light data acquired by the communication section 11. Note that, in a case where a memory card slot or the like is provided to have a drive of a storage medium shared with the image capture device 250, the storage medium such as the memory card used in the image capture device 250 may directly function as the storage section 12, or the data may be transferred from the storage medium shared with the image capture device 250, and be stored in the internal storage medium (storage section 12) of the information processing apparatus 1.

The calculation section 10 includes a CPU 51 which will be explained later with reference to FIG. 4. As functional parts to be implemented by a program started in the calculation section 10 (CPU 51), a vegetation index calculation section 10A, a ratio calculation section 10B, an extraction section 10C, a generation section 10D, and an output control section 10E are provided.

The vegetation index calculation section 10A calculates vegetation data by using the RED image data and the NIR image data taken into the storage section 12, that is, vegetation observation data. The calculated vegetation data is stored, as vegetation data on the date and time/position of the observation data, in the storage section 12.

Specifically, the vegetation data calculation section 10A obtains, as the vegetation data, an NDVI value which is one of vegetation indexes.

By use of the stored RED image data and NIR image data, NDVI is calculated by $$\text{NDVI} = (1 - \text{RED}/\text{NIR})/(1 + \text{RED}/\text{NIR}).$$

Note that total sunlight data is acquired as the first ambient light data, and scattered light is acquired as the second ambient light data. The NDVI may be corrected with use of a red detection value E-RED and a near-infrared light detection value E-NIR of the total sunlight acquired at a time the same (or substantially the same) as the acquisition time of the RED image data and the NIR image data.

That is, with a reference coefficient defined as $\alpha$, $$\text{correction coefficient } k = \alpha \cdot E\text{-NIR}/E\text{-RED}$$

is obtained. With use of the correction coefficient $\alpha$, NDVI is set to a value corrected by $$\text{NDVI} = (1 - k \cdot \text{RED}/\text{NIR})/(1 + k \cdot \text{RED}/\text{NIR}).$$

The vegetation index calculation section 10A executes processing of obtaining NDVI of each time point by the above calculation. NDVI of each time point is saved in the storage section 12.

The ratio calculation section 10B calculates ratio information which is a component ratio of ambient light so as to correspond to the vegetation data (NDVI) of each time point, by using a detection value of the time point.

The component ratio of ambient light is the ratio of components which are included (are decomposable) in the ambient light (e.g., the illumination ratio of the components).

In this case, a component ratio of ambient light is the ratio of total sunlight and scattered light, or is the ratio of direct light and scattered light. That is, ratio information=(direct light)/(scattered light)

or ratio information=(total sunlight)/(scattered light).

In addition, the detection values include detection values E-RED, E-GREEN, E-BLUE, E-NIR of R, G, B, IR, and, for example, the G detection value E-GREEN is used for calculation of the ratio information. For example, ratio information=($G$ detection value $E$-GREEN of direct light(or total sunlight))/($G$ detection value $E$-GREEN of scattered light).

Alternatively, the illumination by use of the value of detection values (E-RED)+(E-GREEN)+(E-BLUE) and may be obtained, and then, the ratio information may be obtained by ratio information=(illumination of direct light (or total sunlight))/(illumination of scattered light).

The ratio information calculated by any of the aforementioned methods, is saved, in the storage section 12, in association with NDVI of the corresponding the date and time/position.

The extraction section 10C extracts, from a data group including NDVI of multiple time points respectively associated with ratio information which is the ratio component of ambient light, vegetation data for use by using the ratio information.

That is, the NDVI of each time point is obtained and saved by the vegetation index calculation section 10A, and the NDVI of each time point is associated with the ratio information obtained by the ratio calculation section 10B. Accordingly, a data group including NDVI of the time points during a certain time period is formed in the storage section 12. The extraction section 10C executes processing of extracting NDVI for use in generation of vegetation change information from the data group by referring to the ratio information.

Note that extraction of a part of the NDVI of each time point is not particularly needed. When being arranged, all the NDVI can be used as vegetation change information indicating a time series change of NDVI. However, in this case, due to the influence of weather, even an NDVI value that is not so appropriate for time series observation is included. The present embodiment attempts to extract NDVI appropriate for time series observation, and to create vegetation change information by using the NDVI.

The generation section 10D generates vegetation change information indicating a time series change of the vegetation state, by using the NDVI data extracted by the extraction section 10C. That is, the generation section 10D generates information from which a vegetation change can be observed, by arranging the extracted NDVI in time series.

The output control section 10E controls output of the vegetation change information generated by the generation section 10D. Specifically, the output control section 10E executes processing of storing the vegetation change information during a certain time period in the storage section 12, or supplying the vegetation change information to the output section 13 so as to output the vegetation change information therethrough.

The output section 13 outputs vegetation change information IFT generated by the calculation section 10.

For example, the output section 13 serves as a display output section to supply the vegetation change information IFT in a form of image data to a display device, so that display output is performed.

Alternatively, for example, the output section 13 serves as a printing control section to supply the vegetation change information IFT in a form of printing information, to a printer device, so that printing output is performed.

Alternatively, for example, the output section 13 serves as an external-device communication section to transmit the vegetation change information IFT to an external device.

Although a specific processing example will be explained later, the calculation section 10 (or the information processing apparatus 1 including the calculation section 10) has at least the function of the extraction section 10C by hardware or software in the configuration in FIG. 3, and thus, corresponds to the information processing apparatus set forth in the claims.

Also, the information processing apparatus 1 can be implemented by a PC (personal computer), an FPGA (field-programmable gate array), or the like.

Further, in the aforementioned configuration, the vegetation index calculation section 10A and the ratio calculation section 10B are included in the information processing apparatus 1 side. However, these sections may be provided in the control section 33 of the image capture device 250 such that NDVI and ratio information in a state of being able to be associated with each other may be transmitted from the image capture device 250 to the information processing apparatus 1.

Moreover, the functions of the extraction section 10C and the generation section 10D may also be provided in the control section 33 of the image capture device 250 such that the vegetation change information IFT can be outputted by the image capture device 250. In this case, the image capture device 250 corresponds to the information processing apparatus set forth in the claims.

Next, a hardware configuration example (computer device 150) of the information processing apparatus 1 implemented by a PC or the like in the present embodiment will be explained with reference to FIG. 4.

Figure 4:
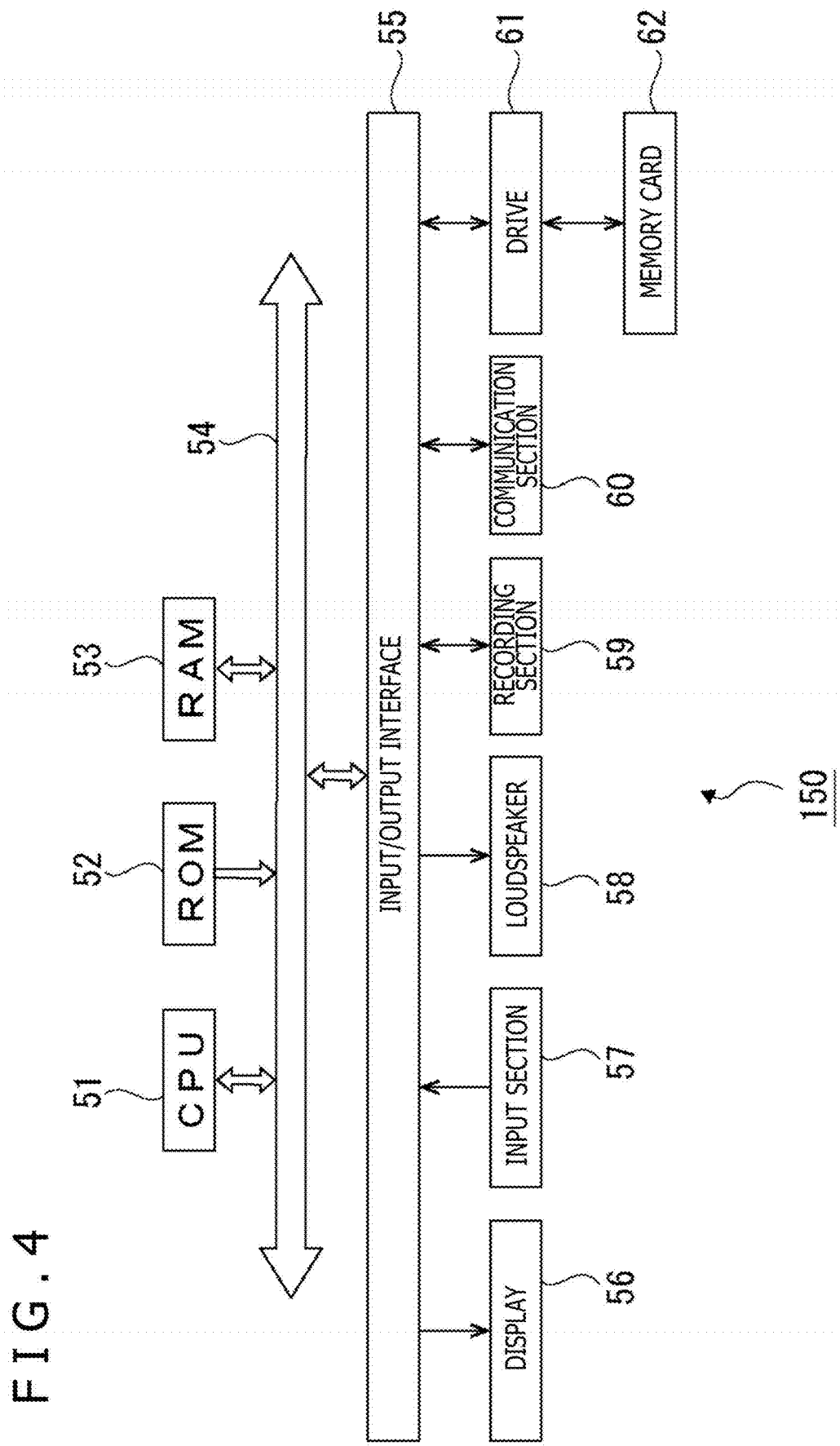
FIG. 4 is a block diagram of a computer device that can be used in the embodiment.

As depicted in FIG. 4, the computer device 150 includes the CPU (Central Processing Unit) 51, a ROM (Read Only Memory) 52, and a RAM (Random Access Memory) 53.

The CPU 51 executes various processing in accordance with a program stored in the ROM 52 or a program loaded from a recording section 59 into the RAM 53. The RAM 53 further records data necessary for the CPU 51 to execute the various processing, and the like, as appropriate.

The CPU 51, the ROM 52, and the RAM 53 are mutually connected via a bus 54. An input/output interface 55 is also connected to the bus 54.

A display 56 includes a liquid crystal panel, an organic EL (Electroluminescence) panel, or the like, an input section 56 includes a keyboard, a mouse, or the like, a loudspeaker 58, the recording section 59 includes an HDD (Hard Disk Drive) or the like, and a communication section 60, etc., can be connected to the input/output interface 55.

The display 56 may be integrated with the computer device 150 or may be a separated device. For example, a captured image or a composite image is displayed, or an evaluation index is displayed.

The input section 57 means an input unit which is used by a user using the computer device 150.

The communication section 60 executes communication processing over networks including the internet, or executes communication with peripheral devices.

A drive 61 may also be connected to the input/output interface 55, if needed. A memory card 62 may be attached thereto. A computer program read out from the memory card 62 may be installed into the recording section 59, if needed, or data processed at the CPU 51 is recorded in the recording section 59. Obviously, a recording and reproducing drive for a removable recording medium such as a magnetic disk, an optical disk, or a magneto-optical disk, may be used as the drive 61.

With this hardware configuration, processing to be performed by the information processing apparatus 1 according to the embodiment, or processing to be performed by the extraction section 10C and the generation section 10D, and further processing to be performed by the vegetation index calculation section 10A, the ratio calculation section 10B, and the output control section 10E can be executed. That is, these processing can be implemented by software which is started at the CPU 51. A program constituting the software is installed into the computer device 150 in FIG. 4 by being downloaded from a network or being read out from a removable recording medium. Alternatively, the program may be preliminarily stored in an HDD or the like serving as the recording section 59. Upon start of the program at the CPU 51, the functions of the aforementioned sections are implemented.

Note that the information processing apparatus 1 according to the embodiment is not limited to the single computer device (information processing apparatus) 150 having the hardware configuration as depicted in FIG. 4, and may be configured by a system of a plurality of computer devices. The plurality of computer devices may be systemized by a LAN (Local Area Network) or the like, or may be disposed at remote places over a VPN (Virtual Private Network) or the like using the internet or the like. The plurality of computer devices may include a computer device that can be used through a cloud computing service.

In addition, the computer device 150 in FIG. 4 can be implemented as a desktop or laptop personal computer, or a portable terminal such as a tablet terminal or a smartphone. Also, the function of the information processing apparatus 1 according to the present embodiment can be installed in an electronic device such as a measurement device, an image capture device, a television device, a monitor device, or a facility management device, having the function of the computer device 150.

2. EXTRACTION PROCESSING USING RATIO INFORMATION

The vegetation index data (NDVI) extraction processing using ratio information, to be executed by the calculation section 10 (extraction section 10C) will be explained. This extraction processing is executed for the generation section 10D to generate vegetation change information suitable for time series observation.

First, the necessity for the extraction processing will be explained with reference to FIG. 5.

Figure 5:
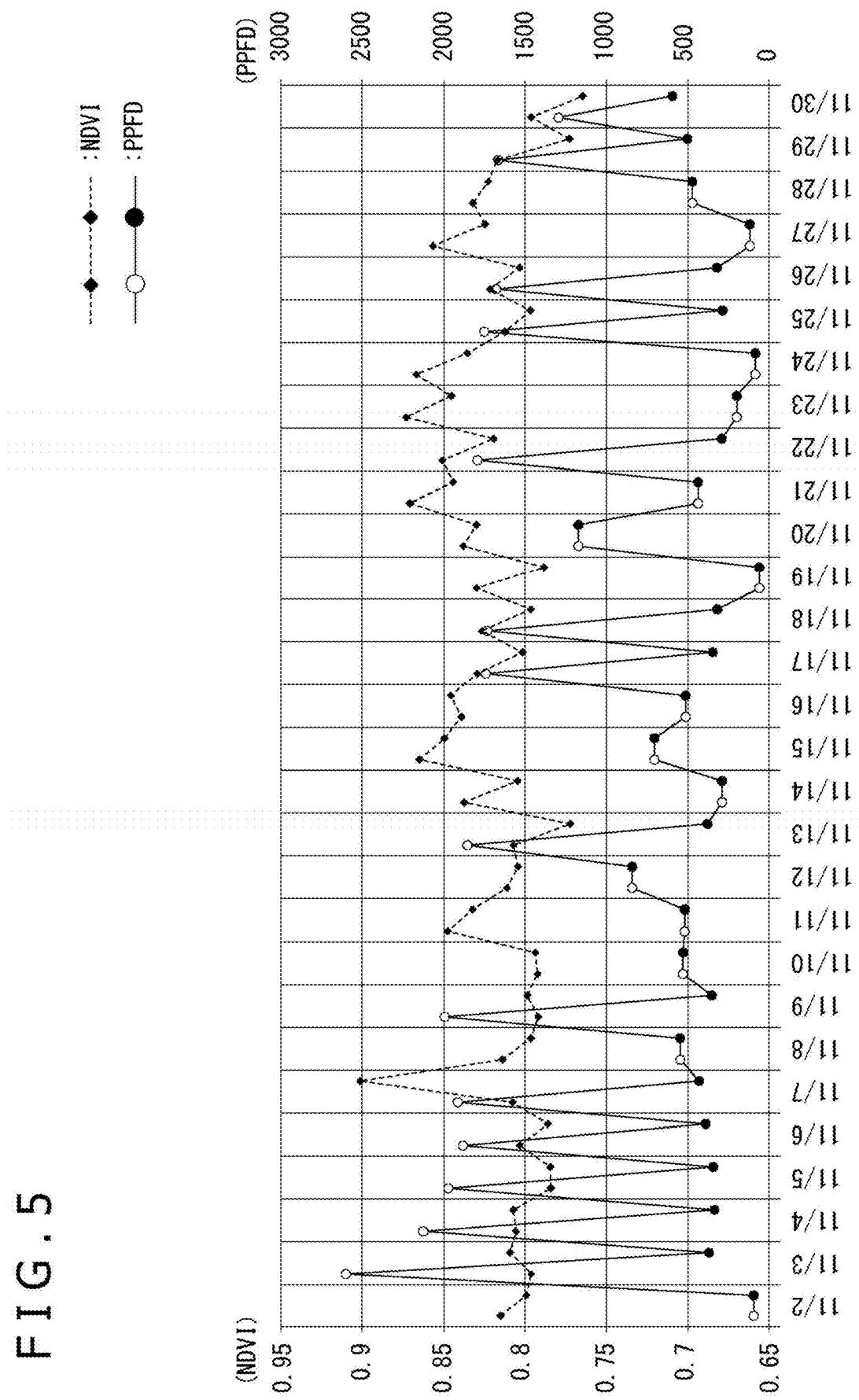
FIG. 5 is a transition diagram of a photosynthesis photon flux density and NDVI obtained through observation in a sunny area and a shaded area.

FIG. 5 depicts NDVI and PPFD observed during a certain time period (here, a time period from 2nd November to 30th November). The horizontal axis represents the date, and the vertical axis represents a NDVI value and a PPFD value. The NDVI is indicated by a broken line, and the PPFD is indicated by a solid line.

Particularly regarding the PPFD, two samples obtained at the same time per day are indicated. White circles each indicate a value observed by a light sensor set in a sunny area, and black circles each indicate a value observed by a light sensor set in a shaded area.

Here, the light sensor set in a sunny area is discussed. A detection value of total sunlight including a direct light component can be obtained By the light sensor set in a sunny area because the light sensor is exposed to direct sunlight. However, this happens in sunny weather. In cloudy weather (including rainy weather), no direct sunlight component is basically included. That is, almost the whole of an obtained detection value of total sunlight is a scattered light component.

On the other hand, the light sensor which is set in a shaded area so as to obtain the values indicated by the black circles, is set at a position which is shaded even in sunny weather. A scattered light component can be detected by this sensor, irrespective of the weather.

Here, an NDVI value is not necessarily considered to be directly correlated to PPFD (or illumination). However, NDVI which is measured outside is likely to come under the influence of the ambient light. This is a factor of a fluctuation according to the variation of the weather or the like.

Meanwhile, the ratio of a detection value obtained by a sunny-area sensor and a detection value obtained by a shaded-area sensor is a value depending on the weather to a certain extent.

Therefore, in the present embodiment, ratio information is generated by the aforementioned manner, and an NDVI value suitable for time series observation is extracted on the basis of the ratio information. In other words, a concept of excluding samples that vary depending on the weather condition, is adopted.

Specific examples will be explained below.

Note that an example in which ratio information=(direct light)/(scattered light) will be described.

Figure 6:
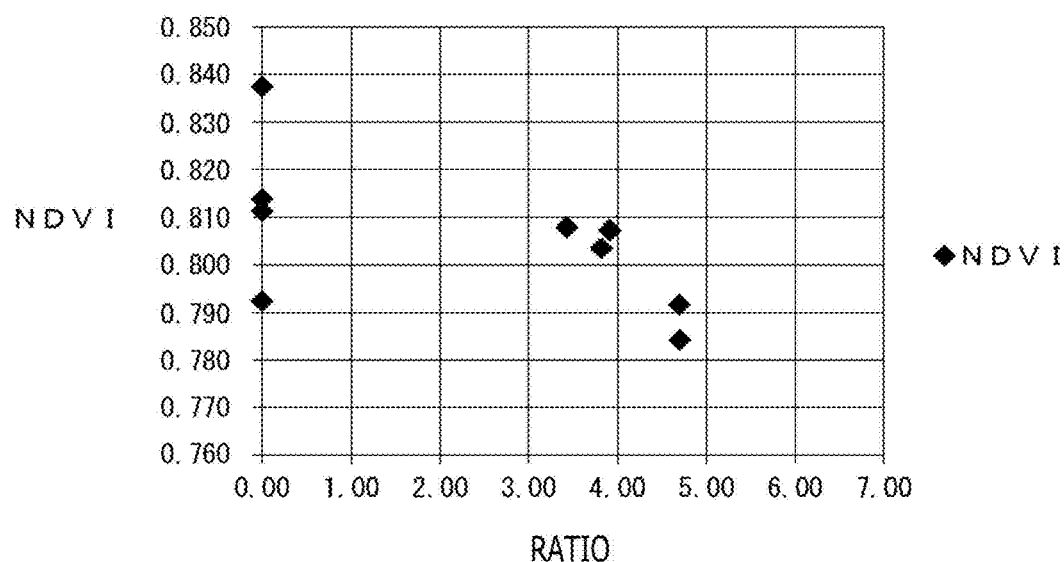
FIG. 6 is an explanatory diagram of examples of ratio information and NDVI obtained by measurement.

FIG. 6A depicts ratio information values and NDVI values observed during a certain time period. Ratio information=0 (or around 0) indicates that direct light=0, that is, indicates a cloudy day (including a rainy day).

Note that, in the case where ratio information=(total sunlight)/(scattered light), total sunlight=scattered light. Thus, the ratio information is around 1 in cloudy weather.

In FIG. 6B, the values in FIG. 6A are depicted such that the horizontal axis represents ratio information and the vertical axis represents NDVI values.

The extraction processing is executed on such daily NDVI data.

A specific example of the extraction processing involves: (Processing 1) excluding NDVI data for which an ambient light component ratio is around 0;
(Processing 2) extracting, as candidates, NDVI data for which an ambient light component ratio is sufficiently greater than 0; and
(Processing 3) finally extracting multiple sets of NDVI data for which the ambient light component ratios (=ratio information) are close to one another from among the NDVI data extracted as candidates.

In this example, at processing 1, the NDVI data of 8th, 11th, and 12th November for which ratio information=0 is regarded as non-use data, and is excluded.

At processing 2, for example, NDVI data for which ratio information is sufficiently apart from a specific value (=0) is extracted. For example, data for which ratio information that is apart by 3.00 or greater is extracted. In this case, the remaining NDVI data is selected as candidates.

Figure 7:
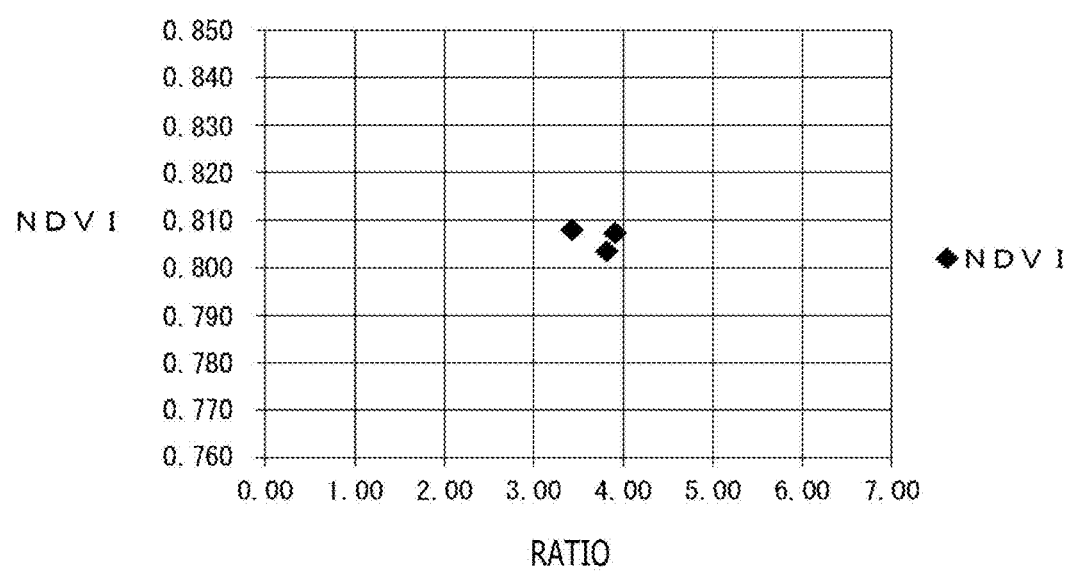
FIG. 7 is an explanatory diagram of extraction processing according to the embodiment.

At processing 3, multiple sets of NDVI for which ratio information are close to one another are extracted. In this case, NDVI data of 6th, 7th, and 13th November is finally extracted. FIGS. 7A and 7B each depict the finally extracted NDVI data of 6th, 7th, and 13th November.

As a result of this extraction processing, vegetation change information suitable for time series observation can be generated.

Figure 8:
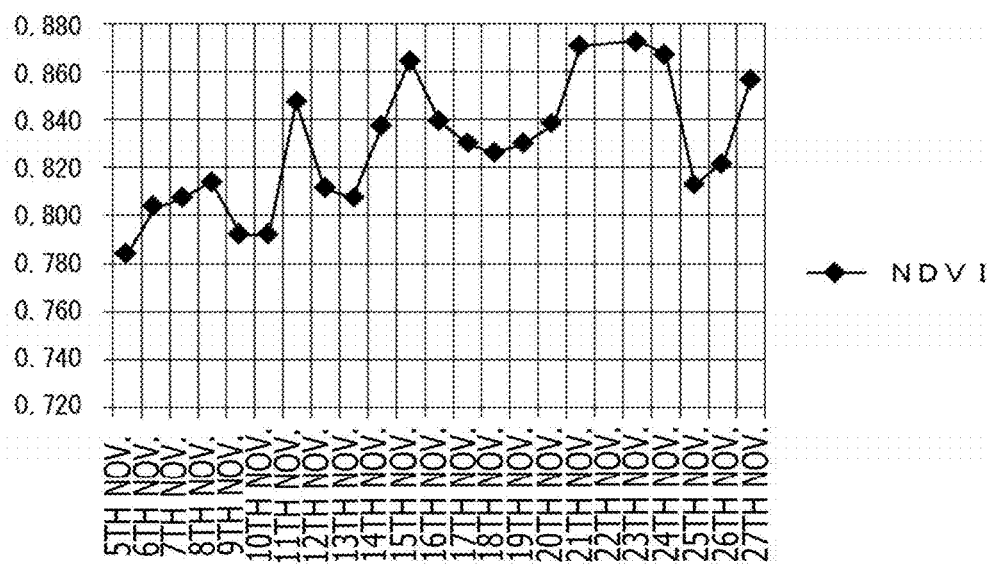
FIG. 8 is an explanatory diagram of vegetation change information generated without undergoing extraction processing.

FIG. 8 depicts a case where the extraction processing is not executed, for comparison. FIG. 8A depicts an NDVI data group associated with ratio information obtained from 5th November to 27th November.

FIG. 8B depicts vegetation change information which is generated by using all the NDVI data without having undergone extraction using ratio information. As depicted in FIG. 8B, the variation of NDVI values is greater, and the changing state of NDVI during the time period is difficult to observe.

Figure 9:
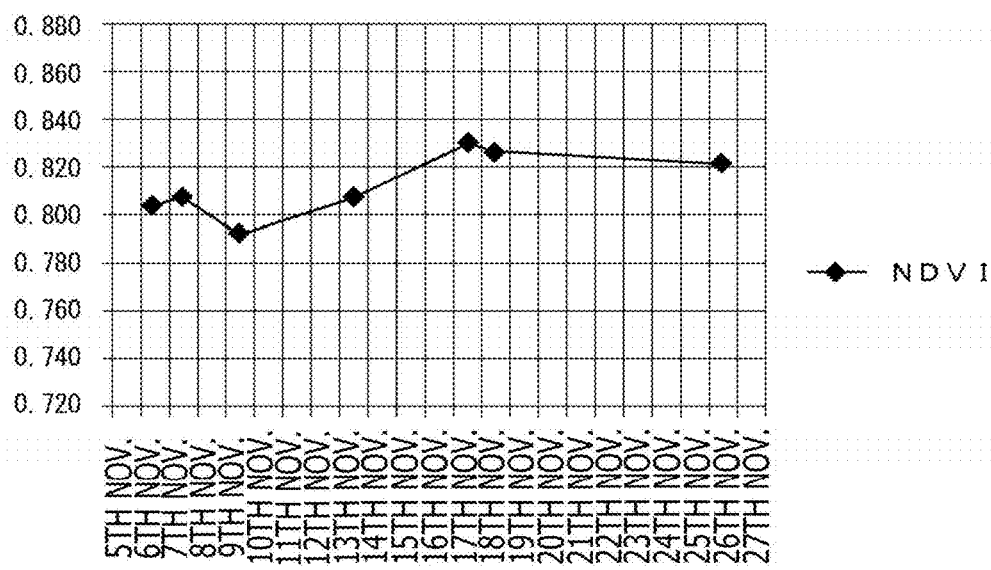
FIG. 9 is an explanatory diagram of vegetation change information generated through the extraction processing according to the embodiment.

On the other hand, FIG. 9 depicts a case where the extraction processing is executed. FIG. 9A depicts the same NDVI data group as in FIG. 8A. The ratio information and the NDVI extracted by the aforementioned processing 1, processing 2, and processing 3, are shaded.

FIG. 9B depicts vegetation change information which is generated by using the extracted NDVI data. In the vegetation change information in FIG. 9B, variation assumed to be caused by the influence of the weather condition is excluded, and the vegetation change during the time period is easily observed.

Note that, in the case where ratio information=(total sunlight)/(scattered light), data for which an ambient light component ratio is around 1 is excluded at the aforementioned processing 1, and further, NDVI data for which an ambient light component ratio is sufficiently greater than 1 is extracted as a candidate at processing 2.

3. CONVERTING PROCESSING OF VEGETATION INDEX USING RATIO INFORMATION

Another example of a method for generating vegetation change information obtained by reducing the influence of variation due to the weather condition will be explained. Extraction processing is executed on daily observation data by:

(Processing a) excluding NDVI data for which an ambient light component ratio is around 0;
(Processing b) extracting, as a candidate, NDVI data for which an ambient light component ratio has a value sufficiently greater than 0; and
(Processing c) obtaining an approximate expression from the correlation between the NDVI data extracted as a candidate and the ratio information, and executing conversion with the value of an ambient light component ratio adjusted to be fixed.

Processing a and processing b are similar to the aforementioned processing 1 and processing 2. As processing c, the following conversion is executed.

Figure 10:
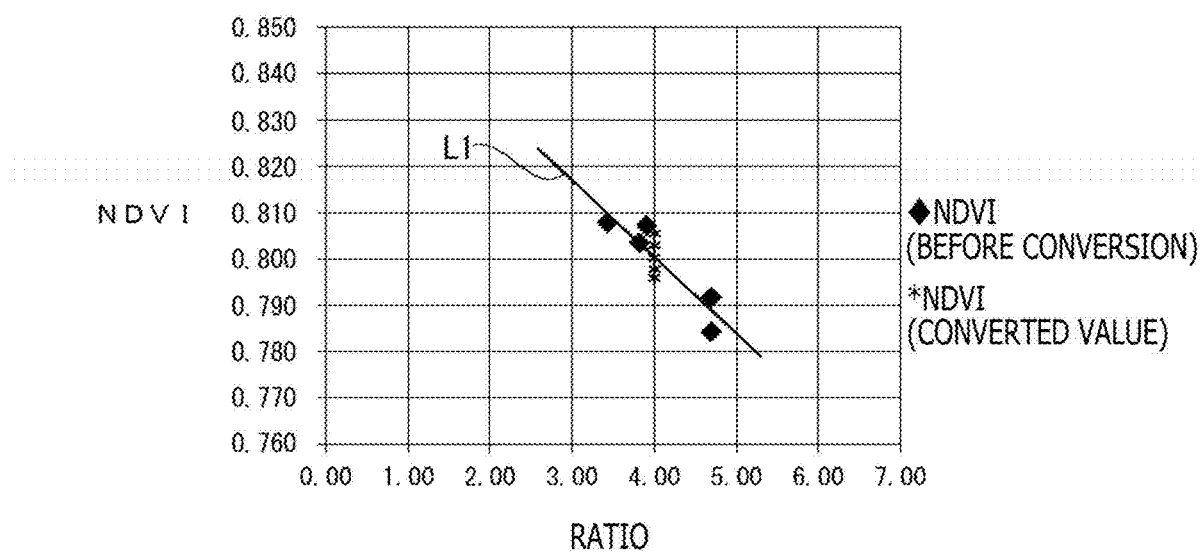
FIG. 10 is an explanatory diagram of conversion of NDVI values according to the embodiment.

By processing a and processing b, NDVI other than that for which ratio information=0 is extracted from the data group in FIG. 6A, for example. FIG. 10B depicts the extracted NDVI values (NDVI value before conversion).

Correlation is acknowledged between the NDVI values before conversion and the ratio information values, and thus, collinear approximation can be performed. The inclination of the approximate straight line L1 is assumed to be −0.0173.

The ratio information, which is distributed in a range from 3.00 to 5.00 in this case, is converted to a fixed value. For example, conversion is executed such that ratio information=4.0.

Note that 4.0 is one example. The fixed value may be arbitrarily defined. For example, the average value, the median value, the centroid value, or the like of the ratio information for the extracted NDVI may be used.

An NDVI value converted with ratio information adjusted to a fixed value of 4.0 is defined by converted NDVI value=0.0173×(ratio information value−4.0)+NDVI.

Thus, conversion can be executed so as to obtain a state where the ambient light component ratio is a fixed value of 4.0.

FIG. 10A depicts NDVI (converted values) obtained by conversion with ratio information=4.0. In FIG. 10B, such a converted value is represented by ".".

Vegetation change information is generated by using the converted NDVI value.

FIG. 11A depicts a data group of NDVI associated with ratio information obtained from 5th to 27th November. The value of the NDV is a converted value obtained by conversion such that ratio information is 4.0.

FIG. 11B depicts vegetation change information using the converted value. In this case, a vegetation change can be well discerned from the information. It can be seen that NDVI is improved by a certain reason (e.g. fertilization) around 14th November, for example.

Figure 11:
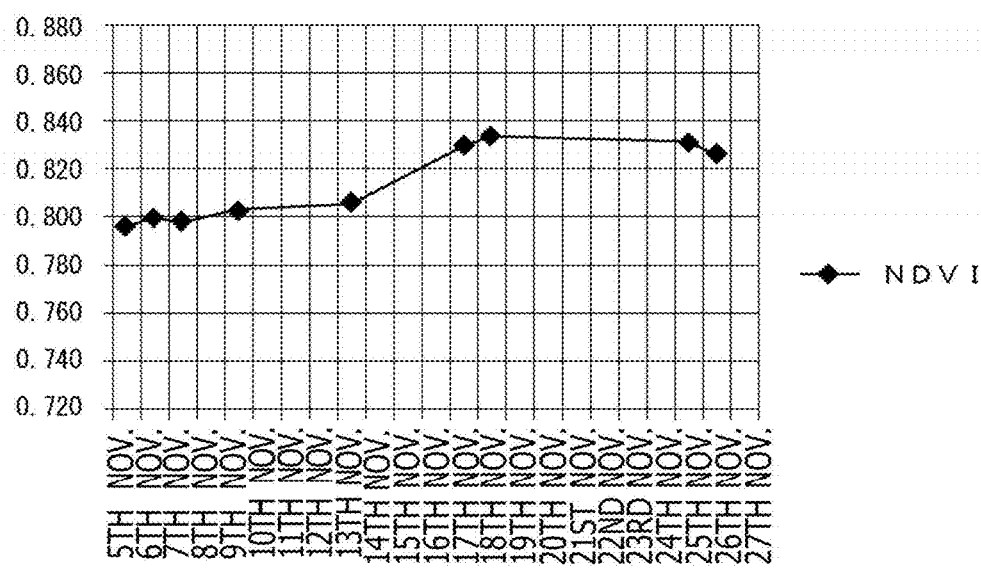
FIG. 11 is an explanatory diagram of vegetation change information generated through the extraction processing and conversion processing according to the embodiment.

Incidentally, in the case of FIG. 11, conversion for the first half of the time period (5th to 13th November) is executed by collinear approximation in FIG. 10B, while conversion for the latter half of the time period (14th to 27th November) is executed by different collinear approximation. For example, in this case, the values of NDVI of the latter half of the time period are greater than those of the first half of the time period. The approximate straight line of the values of NDVI of the latter half of the time period is an approximate straight line L2 depicted in FIG. 12. When the inclination of the approximate straight line L2 is equal to the inclination of the approximate straight line L1, the converted NDVI values obtained by the aforementioned expression can be obtained.

Note that in the case where groups (a group of the first half of the time period and a group of the latter half of the time period) of NDVI values are generated as described above, the groups do not necessarily need to be approximated by respective straight lines having the same inclination. The observed NDVI values may result in approximate straight lines having different inclinations.

Figure 12:
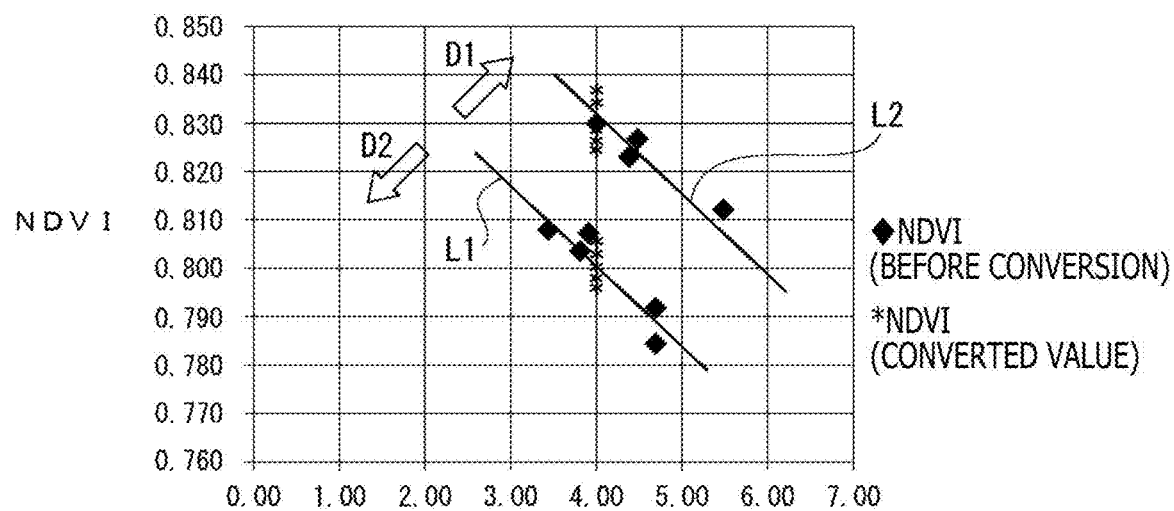
FIG. 12 is an explanatory diagram of an example of collinear approximation during conversion of NDVI values according to the embodiment.

Further, in the example in FIG. 12, the approximate curved line of the latter half of the time period is in a state of being shifted in the direction of an arrow D1 (upper right direction). This indicates an upward trend in the NDVI value. In contrast, in the case where the approximate straight line is shifted in the direction of an arrow D2 (lower left direction), a downward trend of the NDVI values is indicated.

4. PROCESSING EXAMPLES

Examples of processing to be executed by the calculation section of the information processing apparatus 1, including the extraction processing and the conversion processing having been explained above will be explained.

Figure 13:
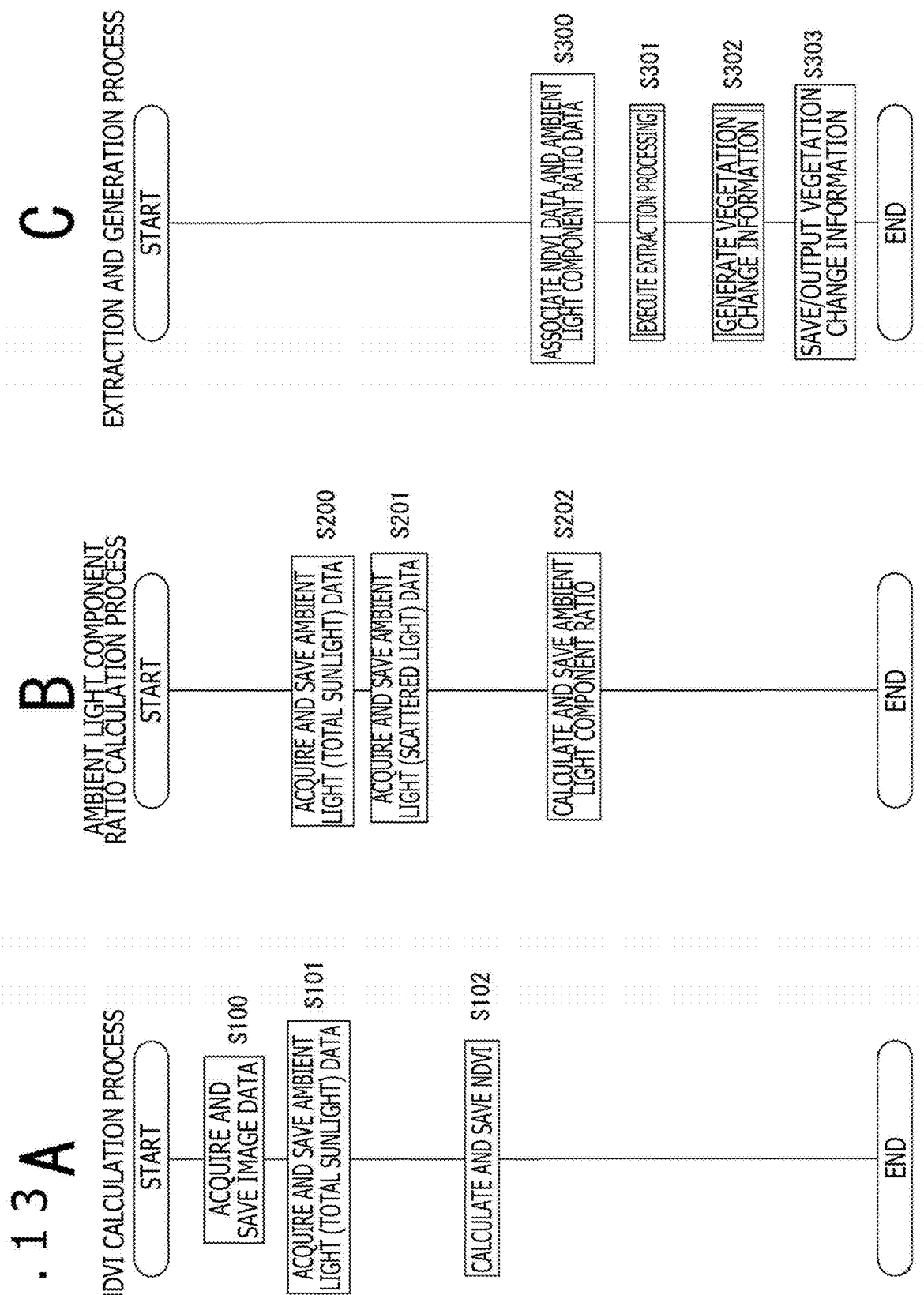
FIG. 13 is a flowchart of a processing example according to the embodiment.

FIGS. 13A, 13B and 13C each depict processing which is executed by the calculation section 10. According to classification by function, in particular, FIG. 13A is considered to depict an example of NDVI calculation processing which is executed by the vegetation index calculation section 10A, FIG. 13B is considered to depict an example of ambient light component ratio (ratio information) calculation processing which is executed by the ratio calculation section 10B, and FIG. 13C is considered to depict an example of the extraction and generation processing which is executed by the extraction section 10C, the generation section 10D, and the output control section 10E.

First, the NDVI calculation processing in FIG. 13A will be explained.

In step S100, the calculation section 10 acquires image data provided from the image capture device 250, and saves the image data in the storage section 12. That is, RED image data and NIR image data are acquired and saved.

In step S101, the calculation section 10 acquires ambient light data provided from the ambient light sensors 260A and 260B via the image capture device 250, and saves the ambient light data in the storage section 12.

Note that the R, G, B, IR detection values (E-RED, E-GREEN, E-BLUE, E-NIR) of total sunlight and the R, G, B IR detection values (E-RED, E-GREEN, E-BLUE, E-NIR) of scattered light are taken in as ambient light data. In the NDVI calculation process, the detection values E-RED, E-NIR of total sunlight are used.

In step S102, the calculation section 10 calculates an NDVI value. That is, by use of the RED image data, the NIR image data and the detection values E-RED, E-NIR of total sunlight, an NDVI value is calculated by $$NDVI=(1-k\cdot RED/NIR)/(1+k\cdot RED/NIR).$$

The calculation section 10 may execute the aforementioned NDVI calculation processing each time image data and ambient light data of each time point are received, or may execute the processing for each time point, when image data and ambient light data of a certain time period are collectively received, or stored in the storage section 12.

Next, the calculation processing of an ambient light component ratio (ratio information) in FIG. 13B will be explained.

In step S200, the calculation section 10 acquires ambient light data provided from the ambient light sensor 260A via the image capture device 250, and saves the acquired ambient light data in the storage section 12.

Note that this processing can be actually executed by the same routine as that in step S101 in FIG. 13A. The R, G, B detection values (E-RED, E-GREEN, E-BLUE) of total sunlight is acquired and saved in order to calculate ratio information.

In step S201, the calculation section 10 acquires ambient light data provided from the ambient light sensor 260B via the image capture device 250, and saves the acquired ambient light data in the storage section 12. That is, the R, G, B detection values (E-RED, E-GREEN, E-BLUE) of scattered light are acquired and saved in order to calculate ratio information.

In step S202, the calculation section 10 calculates ratio information.

$$\text{Ratio information}=(LA-LB)/LB$$

is obtained, wherein the illumination of total sunlight, which is obtained by using the R, G, B detection values (E-RED, E-GREEN, E-BLUE) of total sunlight is LA, and the illumination of scattered light which is obtained by using the R, G, B detection values (E-RED, E-GREEN, E-BLUE) of scattered light is LB. That is, the ratio information is direct light/scattered light.

Alternatively, ratio information=LA/LB may be obtained. That is, total sunlight/scattered light is obtained.

Also, ratio information may be obtained from the G detection values only. That is, $$\text{ratio information}=((E\text{-GREEN of total sunlight})-(E\text{-GREEN of scattered light}))/(E\text{-GREEN of scattered light})$$

or $$\text{ratio information}=(E\text{-GREEN of total sunlight})/(E\text{-GREEN of scattered light})$$

may be obtained.

The extraction and generation processing in FIG. 13C will be explained.

In step S300, the calculation section 10 associates the NDVI data generated by the processing in FIG. 13A with the ambient light component ratio data (ratio information) generated by the processing in FIG. 13B.

That is, a data group in which NDVI of each time point is associated with ratio information as depicted in FIG. 8A is formed.

Then, the calculation section 10 executes processing of extracting NDVI for generating vegetation change information in step S301, and executes processing of generating vegetation change information in step S302.

In step S303, processing of controlling saving of the generated vegetation change information (e.g., the information in FIG. 9B or 11B) in the storage section 12 or controlling output of the generated vegetation change information through the output section 13 is executed.

Various examples of steps S301, S302 are depicted in FIGS. 14 and 15.

FIG. 14A is an example in which extraction is executed by the aforementioned (processing 1), (processing 2), and (processing 3).

In step S350, the calculation section 10 excludes NDVI data for which ratio information is around 0 (in the case where ratio information=direct light/scattered light in processing 1).

For example, the threshold th1=0.5 is set, and NDVI data for which ratio information<th1 is excluded. Note that the threshold th1=0.5 is merely one example. Other than this, the threshold th1=0.1 or the like may be set.

In step S351, the calculation section 10 extracts, as a candidate, NDVI data for which ratio information has a value sufficiently greater than 0 (processing 2). For example, NDVI data for which ratio information is equal to or greater than 3.00 (ratio information is different from the specific value=0 by 3.00 or greater) is extracted. In this case, the remaining NDVI data is selected as a candidate. Needless to say, "3.00" is one example.

In step S352, the calculation section 10 finally extracts multiple sets of NDVI data for which ratio information is determined to be close to one another, from among the NDVI data extracted as candidates (processing 3).

For example, while one of the NDVI data candidates is used as a reference, NDVI data for which ratio information has a difference within a threshold th2=0.01 is retrieved, and a temporary group including the reference NDVI data is generated. This processing is executed while the NDVI data candidates are sequentially used as a reference, whereby temporary groups obtained by using the respective NDVI data as references are generated. Among the temporary groups, all or some of temporary groups each including two or more (or a prescribed number or greater) sets of data are each set as a group of multiple sets of NDVI data for which ratio information is close to one another. Alternatively, a temporary group having the largest number sets of data, or n temporary groups in the descending order of the number of data, may be each set as a group of multiple sets of NDVI data for which ratio information is close to one another.

Subsequently, the NDVI data included in these groups are finally extracted. Accordingly, extracting such as those explained with FIGS. 7B and 9A, for example, is executed.

Note that, in the case where any temporary group including multiple sets of NDVI data is not generated, the threshold th2 may be changed to 0.02, for example, such that generating temporary groups is executed again. Subsequently, in step S353, the calculation section 10 generates vegetation change information by using the multiple sets of finally extracted NDVI data. For example, vegetation change information such as that in FIG. 9B is generated.

Note that, in the case where ratio information=(total sunlight)/(scattered light), data for which the ambient light component ratio is around 1 is excluded in the aforementioned processing 1. For example, a threshold th11=1.5 is set, and NDVI data for which ratio information<th11 is excluded. Alternatively, threshold th11=1.5 and threshold th12=0.5 are set, NDVI data for which th12<ratio information<threshold th11 may be excluded.

In addition, in the processing 2, NDVI data for which the ambient light component ratio is sufficiently greater than 1 (having a difference from the specific value=1 by 3.00 or greater).

FIG. 14B is an example in which extraction and conversion are executed by the aforementioned (processing a), (processing b), and (processing c).

Steps S350, S351 are similar to those in FIG. 14A. That is, in step S350, the calculation section 10 excludes NDVI data for which ratio information is around 0 (in the case where ratio information=direct light/scattered light in processing a). In step S351, the calculation section 10 extracts, as a candidate, NDVI data for which ratio information has a value sufficiently greater than 0 (processing b).

In step S360, the calculation section 10 obtains an approximate expression from the correlation between multiple sets of the DVI data extracted as candidates and the ratio information, and executes conversion with the ambient light component ratio adjusted to a fixed value.

Accordingly, converted NDVI values such as those in FIG. 11A are obtained.

Then, in step S353, the calculation section 10 generates vegetation change information by using multiple sets of finally extracted NDVI data (converted values). For example, vegetation change information such as that in FIG. 11B is generated.

FIGS. 15A and 15B depict other examples of the extraction processing.

In FIG. 15A, the calculation section 10 extracts NDVI data for which ratio information is around 0 (in the case where the ratio information=direct light/scattered light) in step S370. Whether or not ratio information is around 0 is determined by use of the threshold th1 that is set to a value close to 0. For example, the threshold th1 is set to 0.5, and NDVI data for which ratio information<th1 is extracted. The threshold th1 may be set to 1, and NDVI data for which ratio information is 1 or less may be extracted as NDVI data for which ratio information is around 0.

Obviously, only NDVI data for which ratio information=0 may be extracted.

Note that in the case where ratio information=total sunlight/scattered light, NDVI data for which ratio information is around 1 is extracted.

In step S371, the calculation section 10 generates vegetation change information by using the extracted NDVI data.

That is, in this example, only NDVI observed in cloudy weather is extracted, and vegetation change information from which follow-up observation of the NDVI can be conducted is generated.

The reason for this is that, for some vegetation types, areas, climate conditions, soil conditions, seasons, or other environmental conditions, vegetation change information suitable for time series observation can be generated only by observation data obtained in cloudy weather.

FIG. 15B is an example in which the condition for the extraction processing can be variably set.

In step S380, the calculation section 10 sets an extraction condition. For example, a condition for executing the extraction processing is set by a user's input using the input section 57 in FIG. 4 or the like. For example, the extraction processing in FIG. 14A, the extraction processing in FIG. 14B, the extraction processing in FIG. 15A, or the like can be selected by a user.

After the extraction condition is set, the calculation section 10 proceeds to S382 from step S381 to execute extraction of NDVI data in accordance with the set extraction condition. For example, extraction of NDVI data is executed by any one of the extraction processing in FIG. 14A, the extraction processing in FIG. 14B, and the extraction processing in FIG. 15A.

Subsequently, in step S383, vegetation change information is generated by use of the extracted NDVI data.

Note that, as an alternative to the example in which a user specifies a condition for the extraction processing, an example may be adopted in which the calculation section 10 determines the type or properties of vegetation from a captured image, for example, and appropriate extraction processing is set in accordance with the determination result.

5. VARIOUS EXAMPLES REGARDING LIGHT DETECTION USING AMBIENT LIGHT SENSORS

Next, an example concerning the ambient light sensors 260 will be explained.

FIG. 16 depicts various structure examples of the ambient light sensors 260.

Each of FIGS. 16B and 16C is an example in which, in the case where the ambient light sensors 260 are mounted on the upper surface of the flying body 200 as in FIG. 16A, the ambient light sensor 260A for measuring total sunlight and the ambient light sensor 260B for measuring scattered light are separated from each other and are installed in different sensor boxes SB.

The sensor boxes SB herein refer to case body units including the ambient light sensors 260 and other devices. The light reception sections 261 are assumed to be provided on the upper surfaces of the respective sensor boxes SB.

FIG. 16B is an example in which the pole-shaped light shielding body 262 is provided on the ambient light sensor 260B side, as in the aforementioned example in FIG. 1.

FIG. 16C is an example in which the arch-shaped light shielding body 262 is provided on the upper surface of the ambient light sensor 260B so as to cover the light reception section 261.

Each of FIGS. 16D and 16E is an example in which the ambient light sensors 260 for measuring total sunlight and scattered light are mounted on one sensor box SB. In the ambient light sensors 260, two light reception sections 261A and 261B are provided on the upper surface of the sensor box SB, so as to be separated from each other in a diagonal direction.

FIG. 16D is an example in which the roof-shaped light shielding body 262 is provided on the light reception section 261B side. Scattered light is detected on the light reception section 261 B side.

FIG. 16E is an example in which the pole-shaped light shielding body 262 is provided at a middle point of a diagonal line connecting the light reception sections 261A and 261B. The shade of the light shielding body 262 is casted on either one of the light reception sections 261A and 261B in accordance with the attitude direction of the flying body 200 so that scattered light is detected by the light reception section on which the shade is casted.

Regarding scattered light, only direct light of the sunlight is desirably shielded such that the remaining light is taken in. In view of this point, the structure in FIG. 16B or 16E is superior to the structure in FIG. 16C or 16D. However, in view of the reliable shielding of direct light, the structure in FIG. 16C or 16D is superior to the structure in FIG. 16B or 16E.

As depicted in FIG. 16A, the flying body 200 such as a multicopter flies in an attitude slightly tilted toward the advancing direction. Thus, the ambient light sensors 260 often fly at an angle along with the flying body.

A correction value for direct light varies depending on the difference in the incident angle of sunlight incident on the sensor boxes SB of the ambient light sensors 260. This situation is depicted in FIG. 12.

FIG. 17A is a top view of the sensor box SB provided with the ambient light sensor 260. A vector VA indicates a flying direction. FIG. 17A depicts an example in which the advancing direction is exactly the north. Further, FIG. 17B is a side view of the sensor box SB.

Further, an IMU (inertia measuring device) is mounted on the sensor box SB.

On the basis of roll, pitch, yaw values taken out from the IMU (inertia measuring device) mounted on the sensor box SB, two vectors (vector VB1, vector VB2) forming the upper surface of the sensor box SB are extracted. An exterior product of the two vectors is obtained, whereby a vector VH (a normal vector of the upper surface of the sensor box SB depicted in FIG. 17B) orthogonal to the two vectors is obtained. Further, the sunlight is extracted as a vector VS (see FIG. 17B) on the basis of the azimuth and attitude.

Here, on the basis of the normal vector VH of the upper surface of the sensor box SB and the sunlight vector VS, the incident light θ of the sunlight to the sensor box SB can be calculated by an expression of an outer product, represented by the following (expression $$|\vec{VS} \times \vec{VH}| = |\vec{VS}||\vec{VH}|\sin\theta \qquad \text{[Math. 1]}$$

$$\theta = a\sin\frac{|\vec{VS} \times \vec{VH}|}{|\vec{VS}||\vec{VH}|}$$

The illumination value (LA) of total sunlight and the illumination value (LB) of scattered light can be obtained from the ambient light sensor 260 mounted on the sensor box SB. From these two values, direct light (LC) to the ambient light sensor 260 is calculated. Direct light LC=LA−LB.

However, since the upper surface of the sensor box SB is inclined by the elevation angle φ, correction is made in view of the inclination. The elevation angle φ is obtained by the following (expression 2).

$$|\vec{VZ} \times \vec{VH}| = |\vec{VZ}||\vec{VH}|\sin\phi \qquad \text{[Math. 2]}$$

$$\phi = a\sin\frac{|\vec{VZ} \times \vec{VH}|}{|\vec{VZ}||\vec{VH}|}$$

By use of the thus obtained incident angle θ of the sunlight to the sensor box SB (that is, to the light reception section 261) and the elevation angle φ of the sensor box (that is, of the light reception section 261), $$LC=(LA-LB)/\cos(\theta)*\cos(\varphi).$$

The illumination obtained when a certain surface at a certain distance from a light source is illuminated, becomes maximum when the surface is set to be perpendicular to the traveling direction of the light, and is reduced when the surface is tilted. That is, the illumination has a tendency of varying in proportion to the cosine (COS(θ)) of the incident angle θ. That is, the illumination has diagonal incident characteristics (cosine characteristics).

Therefore, a detection error in direct light (total sunlight) is generated according the flying attitude of the flying body 200. Thus, direct light is preferably obtained through correction considering such cosine characteristics.

Figure 18:
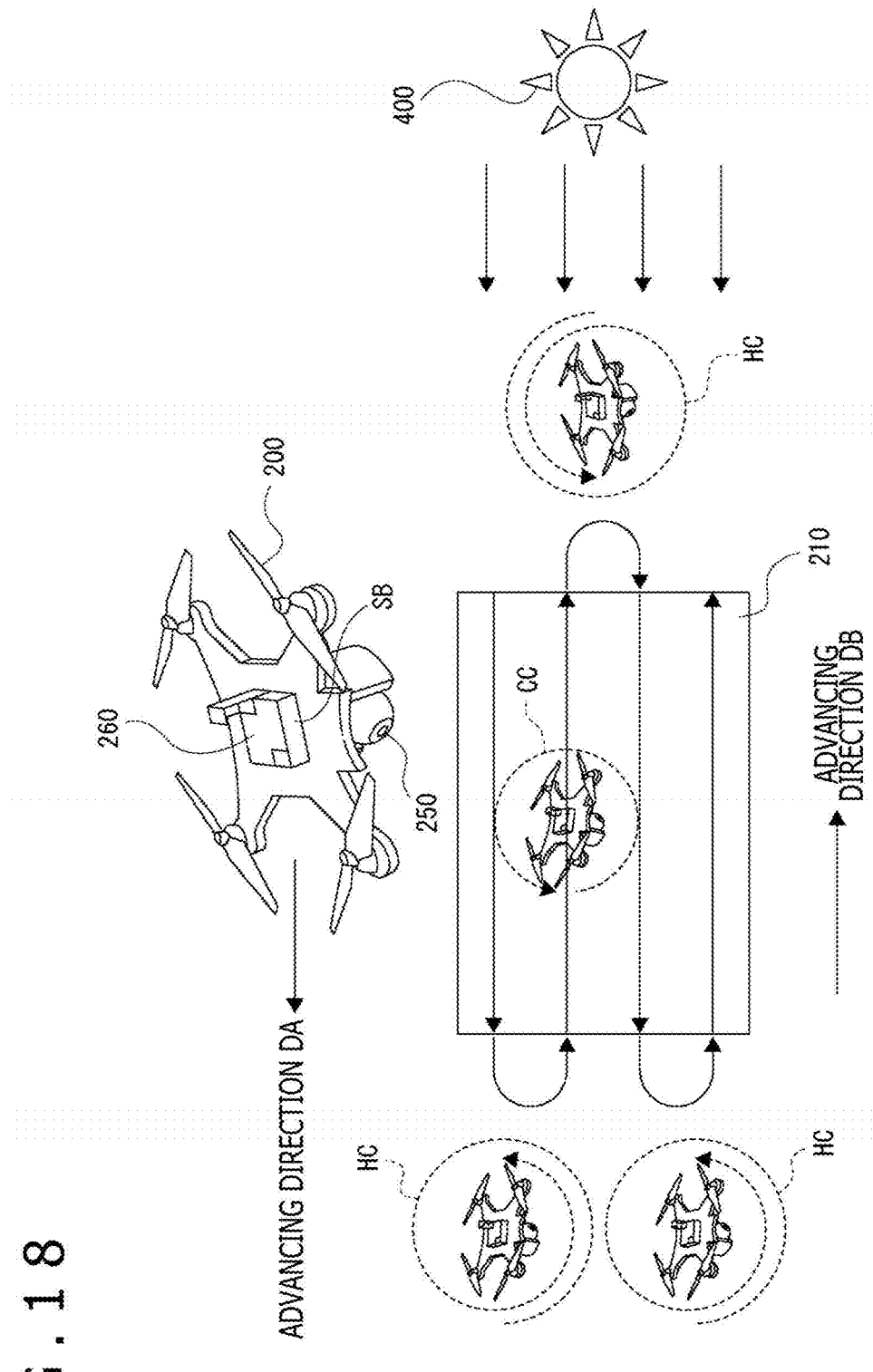
FIG. 18 is an explanatory diagram of a scheme for acquiring scattered light according to the embodiment.

Next, FIG. 18 depicts an example of a flight plan of the flying body 200 for reliably detecting scattered light.

The flying body 200 which flies above the farm field 210 in order to calculate vegetation indexes, repeats a motion of flying in a direction DA in the drawing, and flying in a direction DB by making a U turn or reversely flying in the direction DB upon reaching an end of the farm field 210.

In order to reliably acquire the illumination of scattered light, the ambient light sensors 260 need to well keep out from direct light of the sun 400.

Accordingly, the light shielding body 262 depicted in each of FIGS. 16B to 16E needs to be rotated by 360 degrees.

In the example in FIG. 18, when the flying body 200 makes a U turn at an end of the farm field 210, a direction change is made by one and half rotations in the state of hovering. In addition, even in the farm field, the illumination value of scattered light can be obtained by regular one rotation. Note that, in FIG. 18, each solid line indicates the advancing direction of the flying body 200, and a broken line arrow HC indicates a one-and-half rotation motion of the flying body 200 or a broken line arrow CC indicates a one-rotation motion of the flying body 200.

Accordingly, the flying body 200 sequentially makes one rotation.

The control section provided to the flying body 200, the image capture device 250, or the ambient light sensor 260 determines, as the illumination value of scattered light, a minimum one of the illumination values acquired during a 360° rotation. The determined illumination value is associated, as a detection value of scattered light during this flight, with captured image data.

As a result of this, scattered light can be properly detected by use of the ambient light sensor 260 provided with the light shielding body 262.

Note that an example in which such a 360° rotation is not made may be adopted.

For example, the light shielding body 262 may be automatically or manually set on the basis of the flight plan and the clock time (the position of the sun 400) such that the light reception section 261 of the ambient light sensor 260 is shaded, or the attitude direction of the sensor box SB can be automatically or manually changed.

Next, attitude information in a case where the ambient light sensor 260 is mounted on the flying body 200 will be described.

FIG. 19A depicts the sensor box SB mounted on the flying body 200. FIG. 19B depicts a sensor box SBg which is set on the ground, for example, and includes the ambient light sensors 260.

FIG. 19C depicts the configuration of the sensor boxes SB and SBg, and the signal processing section 310

As depicted in FIG. 19C, the ambient light sensor 260, the IMU 272 and a control section 273 are included in the ambient light sensors 260 in the sensor box SB mounted on the flying body 200.

The ambient light sensor 260 and a control section 373 are included in the sensor box SBg set on the ground.

In the sensor box SB mounted on the flying body 200, a detection value obtained by the ambient light sensor 260 and the attitude information (IMU values: Roll, Pitch, Yaw) of the sensor box SB in synchronization with a timing of acquiring the detection value are necessary. Therefore, the control section 273 acquires the detection value and the attitude information by accessing the ambient light sensor 260 and the IMU 272 at the same timing. The acquired data is transmitted directly or indirectly to the signal processing section 310. Corrected direct light is calculated by using the aforementioned incident angle θ and elevation angle cp.

The signal processing section 310 can be implemented by an FPGA, or can be implemented by an external PC. In addition, this processing may be implemented by uploading the detection value and the attitude information to a cloud computing system.

In addition, in order to further increase the frequency of acquiring scattered light, detection values of total sunlight and scattered light are regularly acquired by means of the sensor box SBg set on the ground, and the control section 373 transmits the detection values to the signal processing section 310. Information about the detection date and time is added to the detection values, and the detection values are collated with a time stamp when the image capture device 250 performs image capturing, whereby acquisition of detection values by the ambient light sensor 260 for a timing when the acquisition is difficult in the air can be interpolated.

6. CONCLUSION AND MODIFICATION

The embodiment has been explained above. According to the embodiment, the following effects can be obtained.

The information processing apparatus 1 according to the embodiment includes the extraction section 10C that extracts, from a data group including vegetation data (e.g. NDVI data) of multiple time points respectively associated with ratio information which is a component ratio of ambient light, vegetation data for use by using the ratio information.

Further, the information processing apparatus 1 according to the embodiment includes a generation section 10D that generates vegetation change information indicating a time series change of a vegetation state, by using the vegetation data extracted by the extraction section 10C.

That is, a data group in which vegetation data of each time point is associated with ratio information about an observation time of the data is set as an object to be processed, and vegetation data (NDVI data) suitable to be outputted is extracted on the basis of the ratio information. By use of the extracted vegetation data, vegetation change information is generated.

In some cases, variation of the values of vegetation data such as NDVI becomes large due to the influence of ambient light. However, only data that is suitable for the purpose of indicating a time series transition by using ratio information, is extracted so that vegetation change information can be generated. That is, in the situation where variation of the values becomes large due to the influence of the weather or the like, vegetation data the value of which has fluctuated due to the influence of the weather is excluded so that vegetation change information properly presenting a time series change of vegetation can be generated. This is very useful for vegetation observation.

In particular, NDVI has a tendency of including large errors and large fluctuations due to the weather. However, as a result of exclusion of fluctuated data, vegetation change information the values of which can be easily compared on the daily basis, as depicted in FIG. 9B or FIG. 11B, can be generated.

In the embodiment, ratio information is the value of the ratio of detection values of direct light and scattered light, or is the value of the ratio of detection values of total sunlight and scattered light. By a light sensor set in a sunny position so as to be able to receive direct light in sunny weather, for example, direct light and scattered light are received so that the light amount of total sunlight can be detected.

Moreover, by a light sensor set in a shaded position so as to be able to receive scattered light in sunny weather, for example, the light amount of scattered light can be detected. The light amount of direct light is obtained by subtracting the light amount of scattered light from the light amount of total sunlight.

Here, in cloudy weather or rainy weather, the amount of direct light is almost zero, and scattered light≈total sunlight. Therefore, the value of the ratio of the detection value of direct light and the detection value of scattered light is almost "0" in cloudy weather or rainy weather. Further, the value of the ratio of total sunlight and scattered light is almost "1" in cloudy weather or rainy weather. That is, the value of ratio information depends on the weather.

By use of the value of the ratio, sunny weather data and cloudy weather (including rainy weather) data can be properly discriminated from each other as vegetation data.

Variation may become large between the value of vegetation information obtained from an image obtained in sunny weather and the value of vegetation information obtained from an image obtained in cloudy weather. Therefore, extraction according to the weather is executed on vegetation data of each time point by use of ratio information so that vegetation data obtained under the similar weather conditions can be collected.

In the embodiment, the example in which the extraction section 10C excludes, from vegetation data for use, vegetation data for which associated ratio information has a value determined to be around the specific value (e.g., around 0 or around 1) by comparison with the threshold th1 (S350 in FIGS. 14A, 14B) has been described.

Accordingly, extraction of vegetation data can be executed such that, from vegetation data for use in generation of vegetation change information, vegetation data obtained by observation in a specific weather is excluded. For example, extraction of vegetation data can be executed such that vegetation data obtained by observation when there is no direct sunlight in cloudy weather (including a rainy weather) is excluded. Accordingly, vegetation change information in which the influence of the weather is reduced can be generated.

In the embodiment, the example in which the extraction section 10C executes processing of extracting vegetation data for which associated ratio information has a value different from the specific value by at least a prescribed amount (S351 in FIG. 14A, FIG. 14B) has been described.

For example, in the case where ratio information is calculated such that the ratio information is "0" or "1" in cloudy weather, the value "0" or "1" is set as the specific value, and vegetation data for which ratio information has a value sufficiently apart from the specific value is extracted as vegetation data for use (or a candidate thereof).

On the basis of the condition that the ratio information is different from the specific value by at least the prescribed amount, vegetation data observed apparently in a non-cloudy state, for example, can be extracted. Accordingly, vegetation data obtained under the similar ambient light conditions can be collected. This is also suitable for generation of vegetation change information in which the influence of the weather is reduced.

In the embodiment, the example in which the extraction section 10C executes processing of extracting multiple sets of vegetation data for which associated ratio information have respective values determined to close to one another by comparison with the threshold th2 (S352 in FIG. 14A) has been described.

The situation in which ratio information which is a component ratio of ambient light is close to one another means that the state of ambient light at the observation time for calculating vegetation data is similar to one another.

Therefore, multiple sets of vegetation data for which ratio information is close to one another can be regarded as samples obtained at different time points but obtained under the similar ambient light states. Accordingly, vegetation data obtained under the similar ambient conditions can be collected. This is suitable for generation of vegetation change information in which the influence of the weather is reduced.

In the embodiment, the example in which the extraction section 10C executes processing of extracting vegetation data for which associated ratio information has a value determined to be around the specific value by comparison with the threshold th1 (S370 in FIG. 15A) has been described.

For example, in the case where ratio information is calculated such that the ratio information is "0" or "1" in cloudy weather, the value "0" or "1" is set as the specific value, and vegetation data for which ratio information has a value around the specific value is extracted as vegetation data for use (or a candidate thereof).

According to the condition that ratio information is close to the specific value, vegetation data obtained by observation in a specific ambient light state (e.g., cloudy weather) can be extracted. Accordingly, vegetation data obtained under the similar ambient light conditions can be collected. This is also suitable for generation of vegetation change information in which the influence of the weather is reduced.

In the embodiment, the example in which an extraction condition of the extraction processing by the extraction section 10C can be variably set (FIG. 15B) has been described.

Accordingly, vegetation data for use can be extracted through selection of various conditions. When the extraction condition can be variably set by a user's operation, for example, a user can extract an arbitrary weather state to generate vegetation change information.

In the embodiment, the example in which the generation section 10D converts the vegetation data extracted by the extraction section 10C to a value with the ratio information adjusted to a fixed value, and generates vegetation change information by using the converted vegetation data (S360 and S353 in FIG. 14B) has been described.

Accordingly, vegetation change information that is further less likely to fluctuate due to the influence of ambient light can be generated. Regarding conversion, usage of an approximate expression leads to accurate conversion.

In the embodiment, the example in which the information processing apparatus 1 (calculation section 10) includes the vegetation data calculation section 10A that calculates vegetation data by using vegetation observation data (e.g., captured image data) of each time point (see FIG. 3) has been described.

As a result of inclusion of the vegetation index calculation section 10A in the information processing apparatus 1, vegetation data such as NDVI data can be acquired, and it is sufficient to acquire only captured image data from the image capture device 250. Accordingly, no particular device load is generated on an observation device side using the flying body 200, etc.

In addition, in the example, the vegetation data calculation section 10A obtains an NDVI value as the vegetation data.

NDVI is an index indicating the distribution condition or activity of vegetation. Generation of vegetation change information as information indicating a time series change of NDVI, is useful in observing a change of the vegetation state.

In the embodiment, the example in which the information processing apparatus 1 (calculation section 10) includes the ratio calculation section 10B that calculates ratio information which is a component ratio of ambient light so as to correspond to vegetation data of each time point, by using a detection value of ambient light at the time point (see FIG. 3) has been described.

The ratio calculation section 10B is included in the information processing apparatus 1 so as to obtain ratio information. Thus, the processing by the extraction section and the generation section can be executed by acquisition of the detection value of the ambient light sensor 260. Therefore, no particular device load is generated to the observation device side using the flying body 200 or the like.

In the embodiment, the example in which the ratio calculation section 10B calculates ratio information by using detection values of the respective light reception sections 261 obtained by the ambient light sensor 260 including the light reception section 261 on which the light shielding body 262 casts a shadow and the light reception section 261 which does not come under the influence of the light shielding body 262 (see FIGS. 2 and 16), has been described.

With the structure having the light shielding body 260, detection of direct light and scattered light is properly carried out by use of the ambient light sensors 260 mounted on the flying body 200. Therefore, in the information processing apparatus 1, the accuracy of ratio information can be made high and vegetation data can be appropriately extracted.

The present technique is not limited to the examples described in the embodiment, and various modification thereof can be made.

NDVI has been described as an example of vegetation data. However, various types of a vegetation index to be used as vegetation data can be adopted. Examples thereof include PRI (photochemical reflectance index)
intensity of chlorophyll fluorescence
chlorophyll fluorescence index
state transition reflectivity, etc.

PRI is obtained by converting, into an index form, a spectral reflectivity which varies in accordance with deep-oxidation in a xanthophyll cycle. A xanthophyll cycle is a mechanism, such as stomata closing caused by strong light or water stress, for discharging, as heat, excess optical energy which cannot be converted by photosynthesis.

Here, PRI is assumed to be calculated by $$PRI=(R570-R531)/(R570+R531).$$

Note that "R570" represents the intensity of reflection light having a wavelength of 570 nm, and "R531" represents the intensity of reflection light having a wavelength of 531 nm.

The intensity of chlorophyll fluorescence may be the intensity of chlorophyll fluorescence (solar-induced chlorophyll fluorescence (SIF)) that is excited by sunlight. The chlorophyll fluorescence may be excited not by sunlight but by a laser or an LED.

A chlorophyll fluorescence index is represented by the ratio of two wavelengths such as two wavelengths of 685 nm and 735 nm, through measurement of chlorophyll fluorescence separately by a few wavelengths.

Stress detection using chlorophyll fluorescence can be carried out. Chlorophyll fluorescence is generated from a plant in association with photosynthesis of the plant, and is a phenomenon in which, if energy is not extracted within a certain time period from a reaction center where electrons are excited by light, the energy is emitted as fluorescence having a wavelength around 680 to 770 nm in higher plants. Emitted energy is 0.5% to 3% of the energy of input light, varies depending on the state of photosynthesis of the plant, and becomes large in a case, such as stomata closing caused by water stress or strong light, where the amount of excess optical energy which cannot be converted by photosynthesis is large.

As a result of image capturing using the image capture device 250 and generation of the indexes based on a composite image generated by a method of the present embodiment (described later), proper analysis and observation of vegetation can be carried out.

Therefore, in a case where the vegetation change information for a time series observation is generated, extraction of vegetation data is assumed to be executed on the basis of ratio information.

An object to be observed is vegetation in the farm field 210. However, this is one example. The present technique is applicable to vegetation observation of lawn on an athletic field such as a soccer field or a baseball field, and vegetation observation in a natural grassland, a forest land, and a primary forest, etc., for example.

The configuration having described in the embodiment is one example.

For example, the calculation section 10 may be mounted on the flying body 200. Further, a microcomputer in the image capture device 250 may function as the calculation section 10. In addition, a microcomputer may be mounted in the sensor box SB including the ambient light sensor 260 so as to function as the calculation section 10.

Detection of total sunlight and scattered light may be executed only by the ambient light sensor 260 set on the ground without using the ambient light sensor 260 mounted on the flying body 200.

The program according to the embodiment of the present invention causes the CPU 51 of the computer device 150 to execute the extraction step (S301) of extracting, from a data group including vegetation data of multiple time points respectively associated with ratio information which is a component ratio of ambient light, vegetation data for use by using the ratio information.

Alternatively, the program causes the CPU 51 of the computer device 150 to execute the extraction step (S301), and the generation step (S302) of generating vegetation change information indicating a time series change of the vegetation state by using the vegetation data extracted at the extraction step.

More specifically, the program causes the CPU 51 of the computer device 150 to execute the processing in FIG. 13C (FIG. 14, FIG. 15).

With this program, the information processing apparatus 1 according to the present embodiment can be easily implemented.

Such a program can be preliminarily stored in a recording medium included in a device such as a computer device, or in a ROM in a CPU-equipped microcomputer, etc. Alternatively, such a program can be temporarily or permanently saved (stored) in a removable recoding medium such as a semiconductor memory, a memory card, an optical disk, a magneto-optical disk, or a magnetic disk. Further, such a removable recording medium can be provided as so-called package software.

In addition, such a program can be installed from the removable recording medium into a personal computer or the like, or can be installed from a download website over a network such as a LAN or the internet.

Note that the effects described in the present description are just examples, and thus, are not limited. In addition, another effect may be exhibited.

Note that the present technique also may have the following configurations.

(1)

An information processing apparatus including:

an extraction section that extracts, from vegetation data of multiple time points respectively associated with ratio information which is a component ratio of ambient light, at least a part of the vegetation data on the basis of the ratio information.

(2)

The information processing apparatus according to (1), further including:

a generation section that generates, by using the vegetation data extracted by the extraction section, vegetation change information indicating a time series change of the vegetation data.

(3)

The information processing apparatus according to (1) or (2), in which the ratio information is a value of a ratio of a detection value of direct light and a detection value of scattered light, or is a value of a ratio of a detection value of total sunlight and the detection value of scattered light.

(4)

The information processing apparatus according to any one of (1) to (3), in which the extraction section executes processing of excluding, from vegetation data for use, vegetation data for which associated ratio information has a value determined to be around a specific value by comparison with a threshold.

(5)

The information processing apparatus according to any one of (1) to (4), in which the extraction section executes processing of extracting vegetation data for which associated ratio information has a value different from a specific value by at least a prescribed amount.

(6)

The information processing apparatus according to any one of (1) to (5), in which the extraction section executes processing of extracting multiple sets of vegetation data for which associated ratio information have respective values determined to be close to one another by comparison with a threshold.

(7)

The information processing apparatus according to any one of (1), (2), (3), (5), and (6), in which the extraction section executes processing of extracting vegetation data for which associated ratio information has a value determined to be around a specific value by comparison with a threshold.

(8)

The information processing apparatus according to any one of (1) to (7), in which an extraction condition for an extraction processing by the extraction section can be variably set.

(9)

The information processing apparatus according to (2), in which the generation section converts the vegetation data extracted by the extraction section, to a value with the ratio information adjusted to be fixed, and generates vegetation change information by using the converted vegetation data.

(10)

The information processing apparatus according to any one of (1) to (9), further including:

a vegetation data calculation section that calculates vegetation data by using vegetation observation data of each time point.

(11)

The information processing apparatus according to (10), in which the vegetation data calculation section obtains an NDVI value as the vegetation data.

(12)

The information processing apparatus according to any one of (1) to (11), further including:

a ratio calculation section that calculates ratio information which is a component ratio of ambient light, so as to correspond to the vegetation data of each time point by using a detection value of ambient light at the time point.

(13)

The information processing apparatus according to (12), in which the ratio calculation section calculates the ratio information by using detection values obtained by an ambient light sensor including a light reception section on which a light shielding body casts a shadow and the light reception section which does not come under an influence of the light shielding body, the detection values being obtained at the respective light reception sections.

(14)

An information processing method including:

executing, by means of an information processing apparatus, processing of extracting, from a data group including vegetation data of multiple time points respectively associated with ratio information which is a component ratio of ambient light, vegetation data for use by using the ratio information.

(15)

A program for causing a computer device to execute processing of extracting, from a data group including vegetation data of multiple time points respectively associated with ratio information which is a component ratio of ambient light, vegetation data for use by using the ratio information.

(16)

An information processing system including:

an ambient light sensor including a light reception section on which a light shielding body casts a shadow, and a light reception section which does not come under an influence of a light shielding body, a ratio calculation section that calculates ratio information which is a component ratio of ambient light by using respective detection values at the light reception sections so as to correspond to vegetation data of each time point, an extraction section that extracts, from a data group including vegetation data of multiple time points respectively associated with the ratio information which is a component ratio of ambient light, vegetation data for use by using the ratio information, and a generation section that generates vegetation change information indicating a time series change of a vegetation state by using the vegetation data extracted by the extraction section.

REFERENCE SIGNS LIST

1 ... Information processing apparatus, 10 ... Calculation section, 11 ... Communication section, 12 ... Storage section, 13 ... Output section, 31 ... Image capture section, 32 ... Signal processing section, 33 ... Control section, 34 ... Storage section, 35 ... Communication section, 200 ... Flying body, 210 ... Farm field, 250 ... Image capture device, 260, 260A, 260B ... Ambient light sensor, 261 ... Light reception section, 262 ... Light shielding body

The invention claimed is:

1. An information processing apparatus comprising:
a memory storing program code; and
a processor configured to execute the program code to perform operations comprising:
calculating vegetation data of multiple time points,
calculating ratio information, the ratio information being based upon a ratio of detected direct light to detected scattered light, or a ratio of detected total sunlight to detected scattered light,
determining extracted vegetation data from the vegetation data on a basis of the ratio information,
generating vegetation change information indicating a time series change of the vegetation data using the extracted vegetation data, and
outputting the vegetation change information.

2. The information processing apparatus according to claim 1, wherein
determining the extracted vegetation data comprises excluding portions of the vegetation data where the ratio information is below a predetermined threshold.

3. The information processing apparatus according to claim 1, wherein
determining the extracted vegetation data comprises excluding portions of the vegetation data where the ratio information is below a first predetermined threshold and above a second predetermined threshold.

4. The information processing apparatus according to claim 1, wherein the operations further comprise:
variably setting an extraction condition for determining the extracted vegetation data.

5. The information processing apparatus according to claim 2, wherein the operations further comprise:
determining a fixed ratio based upon the ratio information of the vegetation data that is not excluded in determining the extracted vegetation data.

6. The information processing apparatus according to claim 1, wherein the operations further comprise:
obtaining an NDVI value as the vegetation data.

7. The information processing apparatus according to claim 1, wherein
calculating the ratio information comprises using detection values obtained by an ambient light sensor including a first light reception section on which a light shielding body casts a shadow and a second light reception section which does not come under an influence of the light shielding body, the detection values being obtained at the respective light reception sections.

8. An information processing method comprising:
calculating vegetation data of multiple time points;
calculating ratio information, the ratio information being based upon a ratio of detected direct light to detected scattered light, or a ratio of detected total sunlight to detected scattered light;
determining extracted vegetation data from the vegetation data on a basis of the ratio information,
generating vegetation change information indicating a time series change of the vegetation data using the extracted vegetation data, and
outputting the vegetation change information.

9. A non-transitory computer readable medium storing program code, the program code being executable by a processor to perform operations comprising:
calculating vegetation data of multiple time points;
calculating ratio information, the ratio information being based upon a ratio of detected direct light to detected scattered light, or a ratio of detected total sunlight to detected scattered light;
determining extracted vegetation data from the vegetation data on a basis of the ratio information,
generating vegetation change information indicating a time series change of the vegetation data using the extracted vegetation data, and
outputting the vegetation change information.

10. An information processing system comprising:
an ambient light sensor including a first light reception section on which a light shielding body casts a shadow and a second light reception section which does not come under an influence of the light shielding body;
a memory storing program code; and
a processor configured to execute the program code to perform operations comprising:
calculating vegetation data of multiple time points,
calculating ratio information, the ratio information being based upon a ratio of detected direct light to detected scattered light, or a ratio of detected total sunlight to detected scattered light,
determining extracted vegetation data from the vegetation data on a basis of the ratio information,
generating vegetation change information indicating a time series change of the vegetation data using the extracted vegetation data, and
outputting the vegetation change information.

11. The method according to claim 8, wherein
determining the extracted vegetation data comprises excluding portions of the vegetation data where the ratio information is below a predetermined threshold.

12. The method according to claim 8, wherein determining the extracted vegetation data comprises excluding portions of the vegetation data where the ratio information is below a first predetermined threshold and above a second predetermined threshold.

13. The non-transitory computer readable medium according to claim 9, wherein
determining the extracted vegetation data comprises excluding portions of the vegetation data where the ratio information is below a predetermined threshold.

14. The non-transitory computer readable medium according to claim 9, wherein determining the extracted vegetation data comprises excluding portions of the vegetation data where the ratio information is below a first predetermined threshold and above a second predetermined threshold.

* * * * *